(12) United States Patent
Lee et al.

(10) Patent No.: US 12,182,365 B1
(45) Date of Patent: Dec. 31, 2024

(54) MOBILE DEVICE AND SWITCHING METHOD OF INPUT METHOD THEREOF

(71) Applicant: Getac Technology Corporation, New Taipei (TW)

(72) Inventors: Jiunn-Jye Lee, Taipei (TW); Ya-Wen Tsai, Taipei (TW)

(73) Assignee: Getac Technology Corporation, New Taipei (TW)

( * ) Notice: Subject to any disclaimer, the term of this patent is extended or adjusted under 35 U.S.C. 154(b) by 0 days.

(21) Appl. No.: 18/374,078

(22) Filed: Sep. 28, 2023

(30) Foreign Application Priority Data

Jun. 7, 2023 (CN) .......................... 202310667735.9

(51) Int. Cl.
*G06F 3/023* (2006.01)
*G06F 3/042* (2006.01)
(Continued)

(52) U.S. Cl.
CPC .......... *G06F 3/0425* (2013.01); *G06F 3/0481* (2013.01); *G06F 3/04845* (2013.01); *G06F 3/04886* (2013.01); *G06K 7/1413* (2013.01); *G06V 30/14* (2022.01); *G06F 2203/04803* (2013.01)

(58) Field of Classification Search
None
See application file for complete search history.

(56) References Cited

U.S. PATENT DOCUMENTS 8,282,002 B2    10/2012   Shams
9,250,712 B1 *   2/2016   Todeschini .............. G06F 9/451
(Continued)

FOREIGN PATENT DOCUMENTS

| CN | 103513892 A | 1/2014 |
|----|-------------|--------|
| CN | 113906379 A | 1/2022 |
| EP | 3200086 A1  | 8/2017 |

OTHER PUBLICATIONS

Tec-It : "Scanner Keyboard User Manual V3: Keyboard with Barcode, Text (OCR) and NEC Tag Scanner", Aug. 2021 (Aug. 2, 2021), XP093133219, Retrieved from the Internet: URL:https://web.archive.org/web/20210802215251/https://www.tec-it.com/en/software/mo bile-data-acquisition/barcode-keyboard/user-manual-3/Default.aspx [retrieved on Feb. 20, 2024].

*Primary Examiner* — Carl Adams
(74) *Attorney, Agent, or Firm* — Locke Lord LLP; Tim Tingkang Xia, Esq.

(57) ABSTRACT

A mobile device and a switching method of input method thereof are provided. The mobile device includes a general camera module, a specific camera module, a barcode-decoding module, a touch display module, and a control module. The touch display module is configured to display a display frame which has an input field. The control module is configured to activate a trigger element of an image conversion input method in response to an input trigger event of the input field. The control module is configured to control the touch display module to display the input field and a first overlapping window which has a virtual keyboard of a system default input method on the display frame at the same time. The control module is configured to control the touch display module to switch the first overlapping window to a second overlapping window in response to a first trigger event.

25 Claims, 27 Drawing Sheets

(51) Int. Cl.
    *G06F 3/0481*     (2022.01)
    *G06F 3/04845*     (2022.01)
    *G06F 3/04886*     (2022.01)
    *G06K 7/14*     (2006.01)
    *G06V 30/14*     (2022.01)

(56) References Cited

U.S. PATENT DOCUMENTS

| | | |
|---|---|---|
| 10,216,286 B2 | 2/2019 | Chornenky |
| 11,029,838 B2 | 6/2021 | Lemay et al. |
| 2013/0001297 A1 | 1/2013 | Snyder et al. |
| 2013/0234945 A1 | 9/2013 | Goktekin |
| 2020/0050272 A1 | 2/2020 | Choi et al. |
| 2021/0019061 A1* | 1/2021 | Hiltgen ................. G06F 3/0632 |
| 2021/0081627 A1 | 3/2021 | Deal et al. |
| 2022/0318036 A1 | 10/2022 | Zhang et al. |
| 2023/0358772 A1* | 11/2023 | Petermann ................. G06T 7/80 |

\* cited by examiner

MOBILE DEVICE AND SWITCHING METHOD OF INPUT METHOD THEREOF

CROSS-REFERENCE TO RELATED APPLICATION

This non-provisional application claims priority under 35 U.S.C. § 119 (a) to patent application No. 202310667735.9 filed in China, P.R.C. on Jun. 7, 2023, the entire contents of which are hereby incorporated by reference.

BACKGROUND OF THE INVENTION

The present disclosure relates to an image conversion input method, and particularly relates to a mobile device and switching method of input method thereof.

In order to meet the special needs in the market, some companies have developed applications with barcode-scanning function and/or optical character recognition (OCR) function, so that the applications can be applied to various types of mobile devices (for example, smartphones, tablet PCs, or industrial touch PCs). However, these applications are not convenient to use. For example, when a user wants to convert a barcode pattern or a character pattern into a string through the application so as to input the string into an input field of another application (for example, Facebook or Google Chrome), the user needs to open a window frame of the application and another window frame of the another application alternately to complete the above operation.

SUMMARY OF THE INVENTION

In order to address the problem(s) mentioned above, the present disclosure provides a mobile device and a switching method of an input method thereof. In one or some embodiments, the mobile device integrates an application which has a barcode-scanning function and/or an OCR function (hereinafter, abbreviated as an image conversion input method) into an input method of the mobile device so as to obtain contents represented by a barcode and/or an image by using the barcode-scanning function and/or the OCR function and input the obtained content into the input field directly. Therefore, the convenience of using the image conversion input method can be improved.

In some embodiments, a mobile device includes a general camera module, a specific camera module, a barcode-decoding module, a touch display module, and a control module. The barcode-decoding module is electrically connected to the specific camera module, wherein the barcode-decoding module is configured to capture at least one barcode pattern through the specific camera module and convert the at least one barcode pattern into at least one first string, and each of the at least one barcode pattern is generated by using the specific camera module to capture at least one barcode. The touch display module is configured to display a display frame, wherein the display frame has an input field. The control module is electrically connected to the general camera module, the specific camera module, and the touch display module, wherein the control module is configured to activate a trigger element of an image conversion input method in response to an input trigger event of the input field, the control module is configured to control the touch display module to display the input field and a first overlapping window which has a virtual keyboard of a system default input method on the display frame at the same time, the control module is configured to control the touch display module to switch the first overlapping window which is displayed to a second overlapping window in response to a first trigger event of the trigger element, and wherein the second overlapping window has a self-defined keyboard of the image conversion input method and a preview pane of the image conversion input method arranged in parallel.

In some embodiments, the trigger element is a virtual button, and the control module is configured to activate the trigger element by controlling the touch display module to display the first overlapping window and the virtual button on the display frame at the same time.

In some embodiments, the mobile device further comprises a housing, wherein the general camera module, the specific camera module, and the touch display module are embedded on the housing, the barcode-decoding module and the control module are disposed in the housing, the trigger element is a physical button, the physical button is embedded on the housing and is electrically connected to the control module, the control module is configured to activate the trigger element by enabling an input method switching function of the physical button, and the first trigger event is a switching signal generated by the physical button.

In some embodiments, the mobile device further comprises a communication module and a control element. The communication module is electrically connected to the control module. The control element is wirelessly connected to the communication module, wherein the trigger element is a physical button on the control element, the control module is configured to activate the trigger element by enabling an input method switching function of the physical button, and the first trigger event is a switching signal generated by the trigger element.

In some embodiments, the trigger element is a specified gesture, the control module is configured to activate the trigger element by enabling a gesture detection input function of the specified gesture.

In some embodiments, the control module is further configured to control the touch display module to switch the second overlapping window which is displayed back to the first overlapping window in response to a recurrence of the first trigger event.

In some embodiments, the control module is further configured to control the touch display module to display a setting window of the image conversion input method in response to a second trigger event of the trigger element.

In some embodiments, the mobile device further comprises at least one selection button, wherein the specific camera module is configured to capture a preview frame which has the at least one barcode pattern, the control module is further configured to activate the barcode-decoding module in response to a barcode selection event of the at least one selection button, the control module is further configured to display the preview frame in the preview pane in a real-time manner after the control module activates the barcode-decoding module, and the control module is further configured to display one of the at least one first string in the input field.

In some embodiments, the at least one barcode pattern comprises a plurality of barcode patterns, the second overlapping window further has a candidate field, the candidate field is above the virtual keyboard and the preview pane, and the control module is further configured to display the at least one first string as input options of the input field in the candidate field after the control module activates the barcode-decoding module.

In some embodiments, the mobile device further comprises a character recognition engine. The character recognition engine is disposed between the general camera module and the control module, wherein the character recognition engine is configured to capture at least one string pattern and another preview frame which has the at least one string pattern through the general camera module and the character recognition engine is configured to recognize and convert each of the at least one string pattern into at least one second string, and each of the at least one string pattern is generated by using the general camera module to capture at least one character In some embodiments, the control module is further configured to activate the character recognition engine correspondingly in response to a character selection event of the at least one selection button, the control module is further configured to display the another preview frame in the overlapping window after the control module activates the character recognition engine in a real-time manner, and the control module is further configured to display one of the at least one second string in the input field.

In some embodiments, the second overlapping window further comprises an enlargement button, and the control module is further configured to control the touch display module to enlarge and display the overlapping window in response to an enlargement trigger event of the enlargement button.

In some embodiments of the present disclosure also provides a switching method of an input method for the mobile device. The switching method includes: displaying an input field on a display frame; activating a trigger element of an image conversion input method through the input field and controlling a touch display module to display the input field and a first overlapping window on the display frame at the same time, wherein the first overlapping window has a virtual keyboard of a system default input method; and switching the first overlapping window on the display frame to a second overlapping window in response to a first trigger event of the trigger element, wherein the second overlapping window has a self-defined keyboard and a preview pane of the image conversion input method arranged in parallel, and the preview pane is linked to a general camera module or a specific camera module.

In some embodiments, the trigger element is a virtual button, and the at the step of displaying the input field and the first overlapping window on the display frame at the same time comprises: displaying the input field, the virtual button, and the first overlapping window which has the virtual keyboard of the system default input method on the display frame at the same time.

In some embodiments, the trigger element is a physical button, the first trigger event is a switching signal generated by the physical button, and the step of activating the trigger element of the image conversion input method through the input field comprises: enabling an input method switching function of the physical button to activate the trigger element.

In some embodiments, the switching method further comprises: receiving the switching signal from the physical button in wired; and switching the first overlapping window which is displayed on the display frame to the second overlapping window in response to the switching signal.

In some embodiments, the switching method further comprises: receiving the switching signal from the physical button wirelessly; and switching the first overlapping window on the display frame to the second overlapping window in response to the switching signal.

In some embodiments, the trigger element is a specified gesture, and the switching method further comprises: detecting the specified gesture; and switching the first overlapping window which is displayed on the display frame to the second overlapping window when the specified gesture is detected.

In some embodiments, the switching method further comprises: switching the second overlapping window which is displayed on the display frame back to the first overlapping window in response to a recurrence of the first trigger event.

In some embodiments, the switching method further comprises: displaying a setting window of the image conversion input method in response to a second trigger event of the trigger element.

In some embodiments, the image conversion input method comprises a barcode-scanning input method, and the switching method further comprises: activating the barcode-scanning input method in response to a barcode selection event; scanning at least one barcode through the barcode-scanning input method to obtain at least one first string; and displaying one of the at least one first string in the input field, wherein the step of scanning the at least one barcode through the barcode-scanning input method comprises: capturing the at least one barcode through the specific camera module to obtain at least one barcode pattern of the at least one barcode; and decoding the at least one barcode pattern into the at least one first string through a barcode-decoding module.

In some embodiments, in the step of capturing the at least one barcode through the specific camera module, a preview frame which has the at least one barcode pattern is further obtained, and the step of scanning the at least one barcode through the barcode-scanning input method further comprises: previewing and displaying the preview frame in the preview pane.

In some embodiments, the at least one first string comprises a plurality of first strings, the second overlapping window further has a candidate field, the candidate field is above the virtual keyboard and the preview pane, and the switching method further comprises: displaying the plurality of first strings as input options of the input field in the candidate field.

In some embodiments, the image conversion input method further comprises a character recognition input method, the mobile device further comprises a character recognition engine, and the switching method further comprises: activating the character recognition input method in response to a character selection event; detecting at least one character through the character recognition input method to obtain at least one second string; and displaying one of the at least one second string in the input field, wherein the step of detecting the at least one character through the character recognition input method comprises: capturing the at least one character through the general camera module to obtain at least one string pattern of the at least one character and another preview frame which has the at least one string pattern; previewing and displaying the another preview frame in the preview pane; and recognizing and converting the at least one string pattern into the at least one second string through the character recognition engine.

In some embodiments, the second overlapping window further comprises an enlargement button, and the switching method further comprises: enlarging and displaying the preview pane in response to an enlargement trigger event of the enlargement button.

In conclusion, according to one or some embodiments, the mobile device or the switching method of the input method thereof have both the system default input method and the image conversion input method so as to provide diverse input functions. Therefore, the user can select an appropriate input method for input operations (such as but not limited to a Chinese/English input, a barcode-scanning input, or an OCR input) when performing a text input of any one of input fields so as to improve the convenience and the efficiency of the text input.

DETAILED DESCRIPTION OF THE INVENTION

Figure 1:
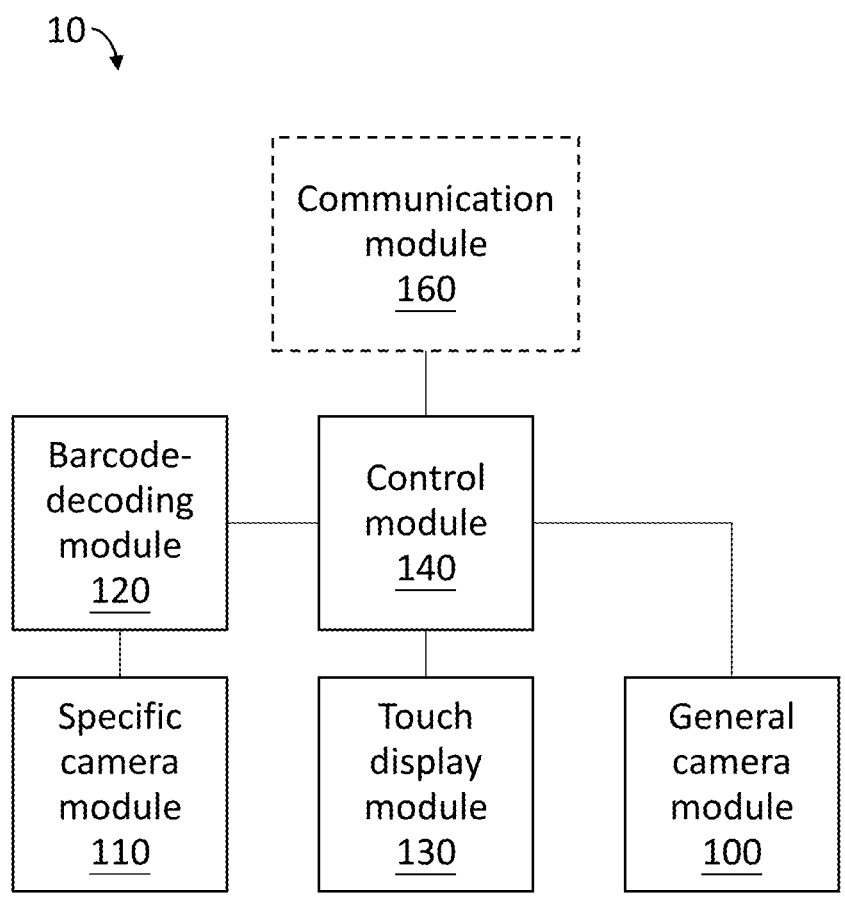
FIG. 1 illustrates a module block diagram of a first embodiment of a mobile device according to the present disclosure.

Please refer to FIG. 1. A mobile device 10 which has various input methods (hereinafter abbreviated as mobile device 10) is provided, and the mobile device 10 can provide various input operations such as virtual keyboard and image conversion (for example, barcode-scanning and/or character recognition). The mobile device 10 includes a general camera module 100, a specific camera module 110, a barcode-decoding module 120, a touch display module 130, and a control module 140. In some embodiments, the barcode-decoding module 120 is electrically connected between the specific camera module 110 and the control module 140, and the control module 140 is electrically connected to the general camera module 100, barcode-decoding module 120, and the touch display module 130.

In some embodiments, the barcode-decoding module 120 can capture at least one barcode pattern through the specific camera module 110 and convert each of the at least one barcode patterns into at least one string (hereinafter referred to as first string).

Figure 2:
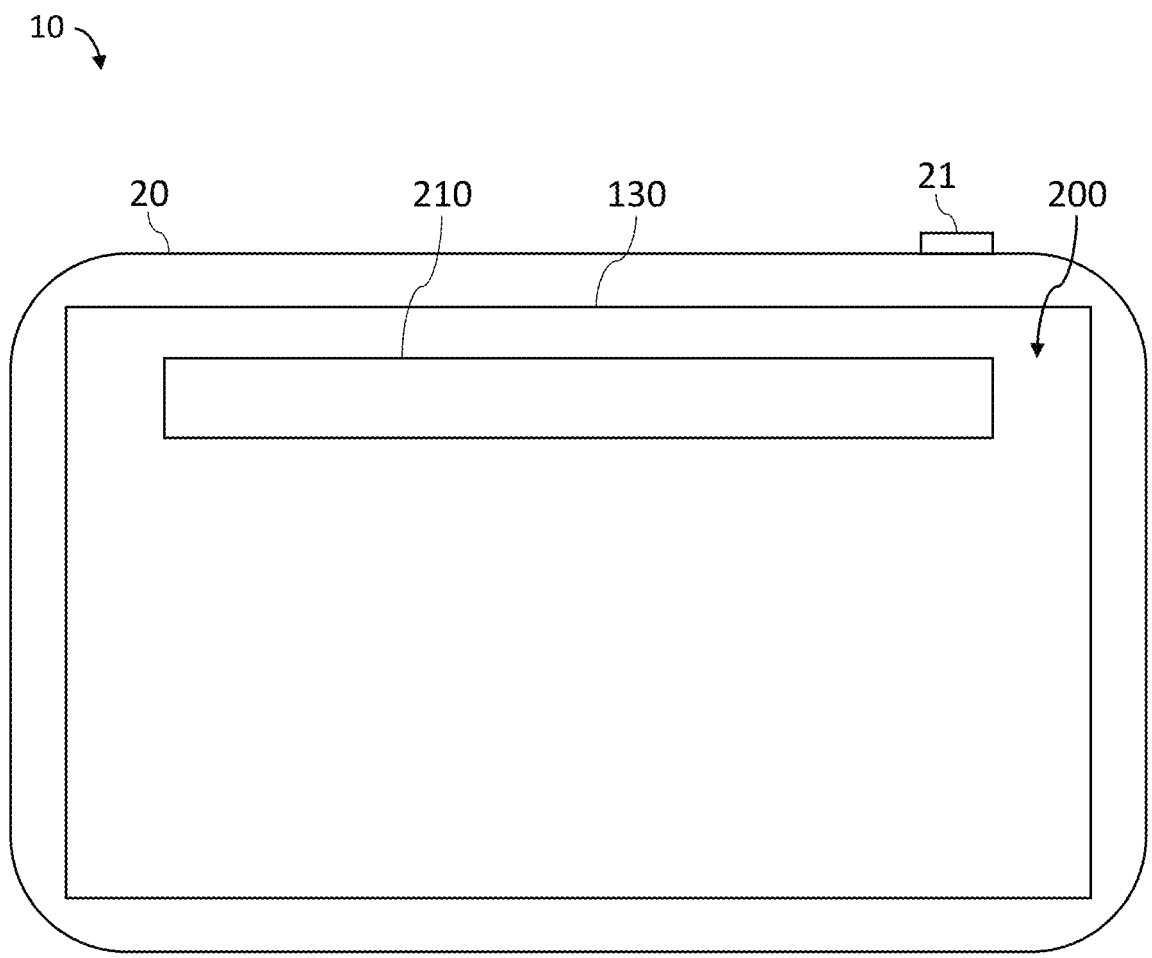
FIG. 2 illustrates a schematic front plan view of an implementation of the mobile device in FIG. 1.
Figure 3:
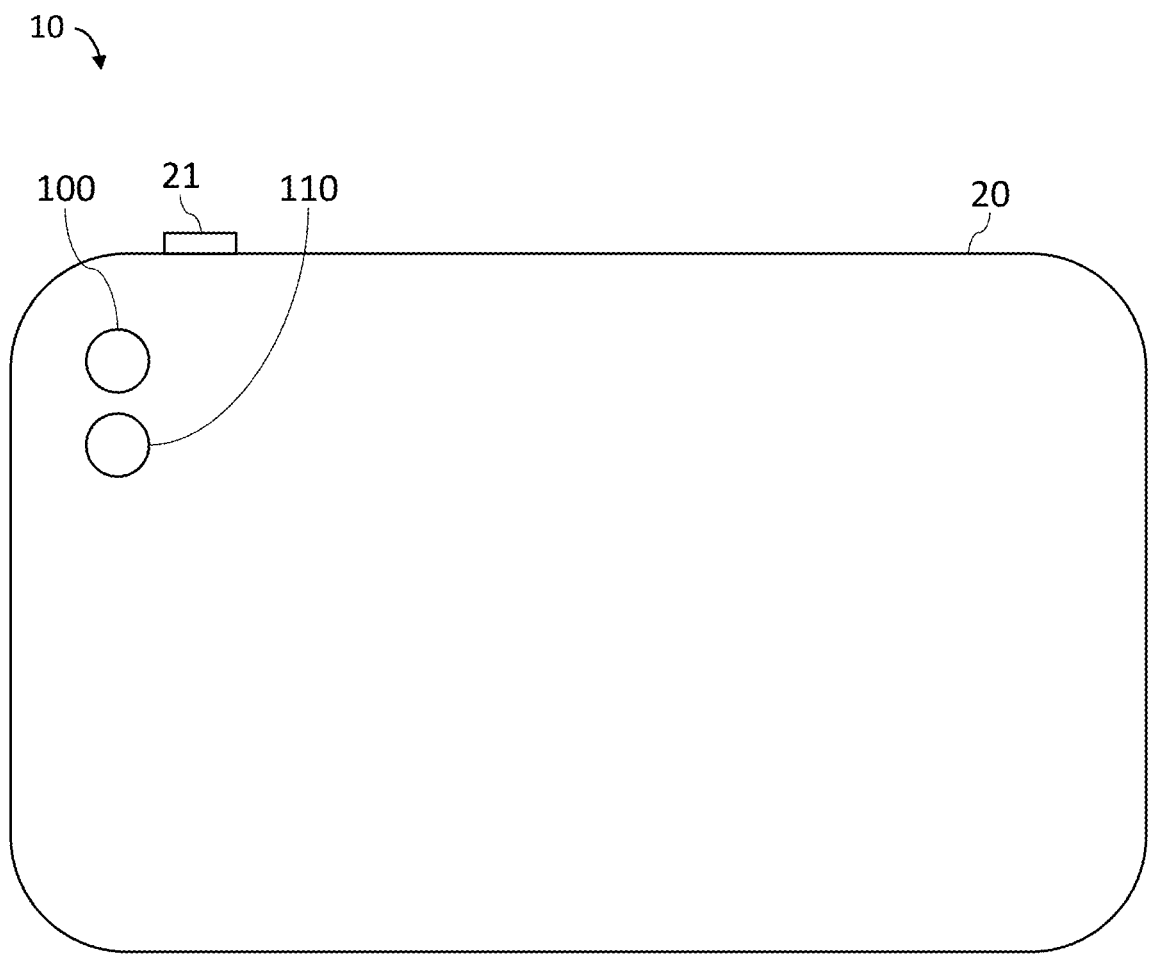
FIG. 3 illustrates a schematic rear plan view of an implementation of the mobile device in FIG. 1.

Please refer to FIG. 1 to FIG. 3. In some embodiments, the mobile device 10 includes a housing 20 and at least one physical button 21. In some embodiments, the touch display module 130 is embedded on the front surface of the housing 20 (as shown in FIG. 2). In some embodiments, the general camera module 100, the specific camera module 110, and the at least one physical button 21 are embedded on the housing 20, and the barcode-decoding module 120 and the control module 140 are disposed in the housing 20 (not shown).

In some embodiments, the general camera module 100 may be embedded on the back surface of the housing 20 (as shown in FIG. 3). In some embodiments, the general camera module 100 may also be embedded on the front surface of the housing 20 (not shown).

In some embodiments, the specific camera module 110 may be embedded on the back surface of the housing 20 (as shown in FIG. 3). In some embodiments, the specific camera module 110 may also be embedded on the side surface of the housing 20 (not shown).

In some embodiments, the at least one physical button 21 may be embedded on the side surface of the housing 20 (as shown in FIG. 3). In some embodiments, the at least one physical button 21 may also be embedded on the front surface of the housing 20 (not shown). In some embodiments, the at least one physical button 21 includes a plurality of physical buttons. In some embodiments, the plurality of physical buttons 21 are all embedded on the side surface of the housing 20 or the front surface of the housing 20. In some other embodiments, some physical buttons 21 are embedded on the side surface of the housing 20, and the other physical buttons 21 are embedded on the front surface of the housing 20.

In some embodiments, the mobile device 10 may be a device which has a touch function and a text input application, such as but not limited to a smartphone, a tablet computer, or a touch computer. In some embodiments, the general camera module 100 may be a front camera or a rear camera on the mobile device 10 which is normally configured to take pictures or record videos.

Figure 4:
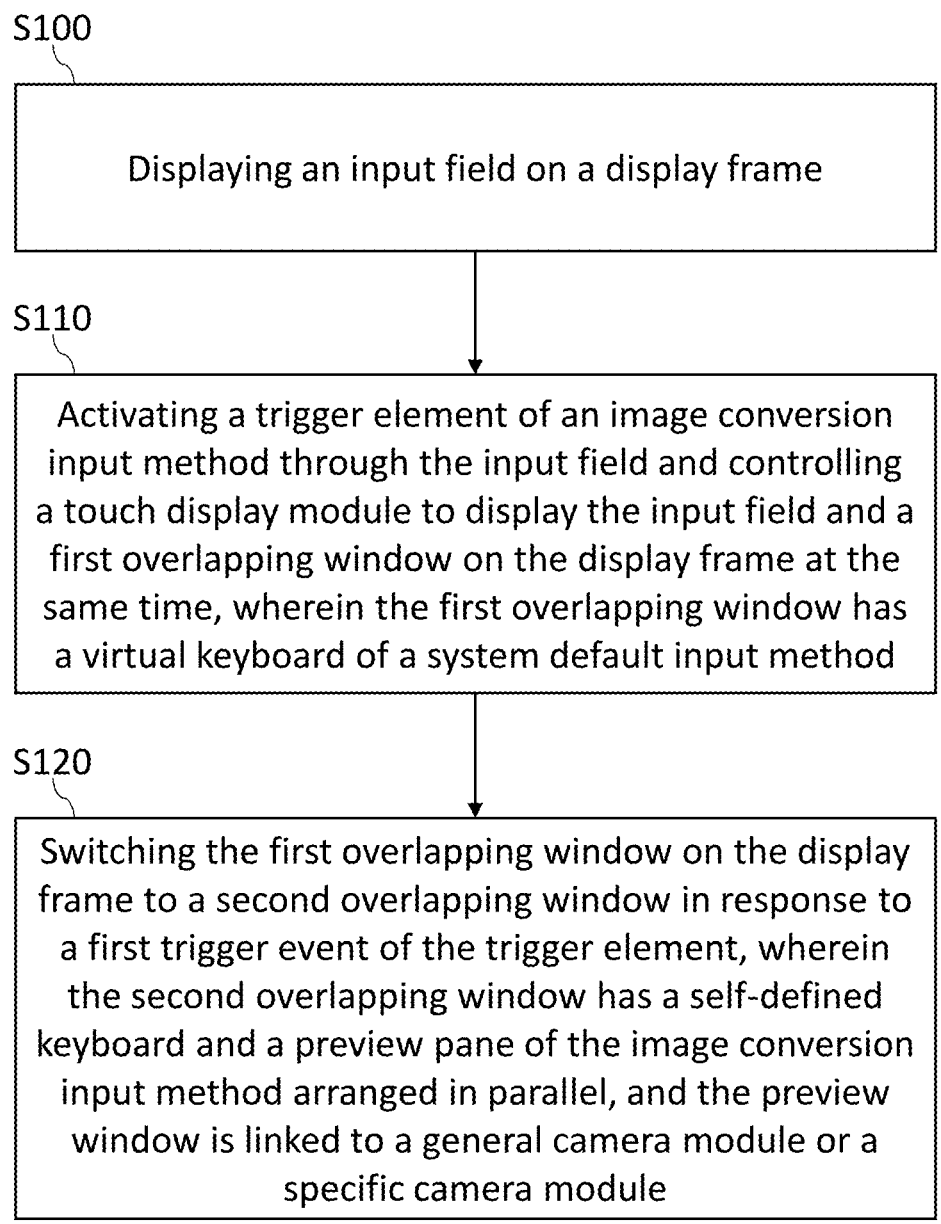
FIG. 4 illustrates a flowchart showing the operation of a mobile device according to some embodiments of the present disclosure.
Figure 5:
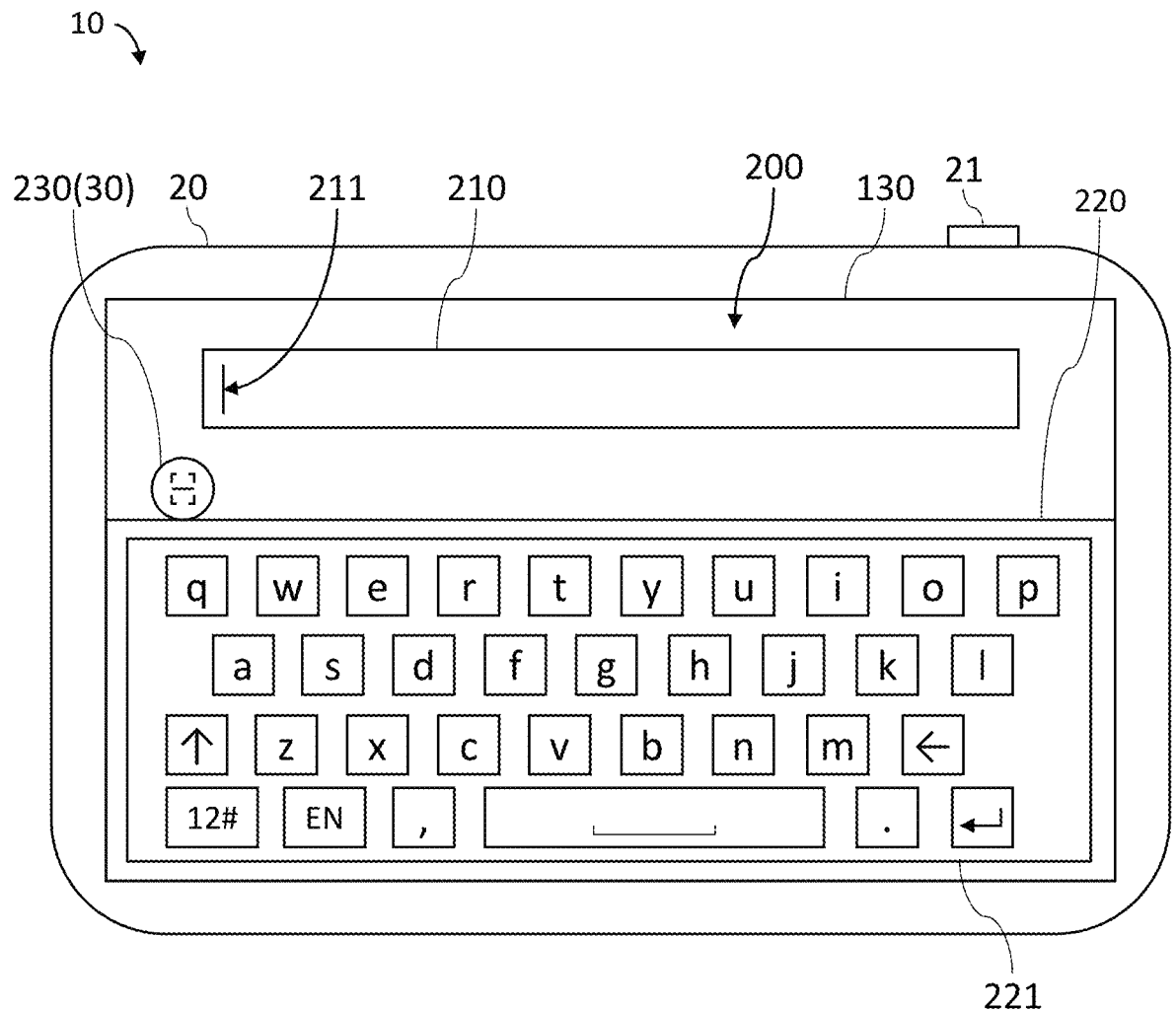
FIG. 5 illustrates a schematic view of an implementation of an input field in FIG. 2 after being processed via the step S110 in FIG. 4.

Please refer to FIG. 1 to FIG. 6. When the mobile device 10 starts operating, the touch display module 130 displays an input field 210 on a display frame 200 (the step S100, as shown in FIG. 5).

In some embodiments, the size of the display frame 200 is not greater than the size of the screen of the touch display module 130. For example, the size of the display frame 200 may be substantially equal to the size of the touch display module 130 (as shown in FIG. 2).

In some embodiments, the input field 210 may be a desktop widget constantly configured on the desktop and provided by an operating system or an application of the mobile device 10 (such as but not limited to a search bar on the main frame of the mobile device 10), a field of the application or a search engine in a webpage (such as but not limited to an App Store search engine or a Google search engine), or a text input page or field in the application or the webpage (such as but not limited to an input page of Word Application or a field for creating a post of Facebook Application).

After the step S100, the control module 140 activates a trigger element 30 of an image conversion input method, and in response to an input trigger event of the input field 210, the control module 140 controls the touch display module 130 to display the input field 210 and a first overlapping window 220 in the display frame 200 at the same time (the step S110, as shown in FIG. 5). In some embodiments, the first overlapping window 220 has a virtual keyboard 221 of a system default input method, and the system default input method is linked to the input field 210.

In some embodiments, the trigger element 30 is a virtual button 230, and the control module 140 controls the touch display module 130 to display the input field 210, the first overlapping window 220, and the virtual button 230 on the display frame 200 at the same time so as to activate the trigger element 30. In other words, in some embodiments, the control module 140 controls the touch display module 130 to display the trigger element 30 to implement the activation for the trigger element 30 of the image conversion input method. In some implementations, the virtual button 230 may be disposed in the display frame 200 floatingly; in other words, a user can press and drag the virtual button 230 to any position in the display frame 200, and the virtual button 230 will stay at the dragged current position in the display frame 200 after the user releases the virtual button 230. In other implementations, the virtual button 230 may be disposed in the display frame 200 fixedly; for example, the virtual button 230 is located at the middle position of the display frame 200 fixedly which is adjacent to the left side.

Figure 6:
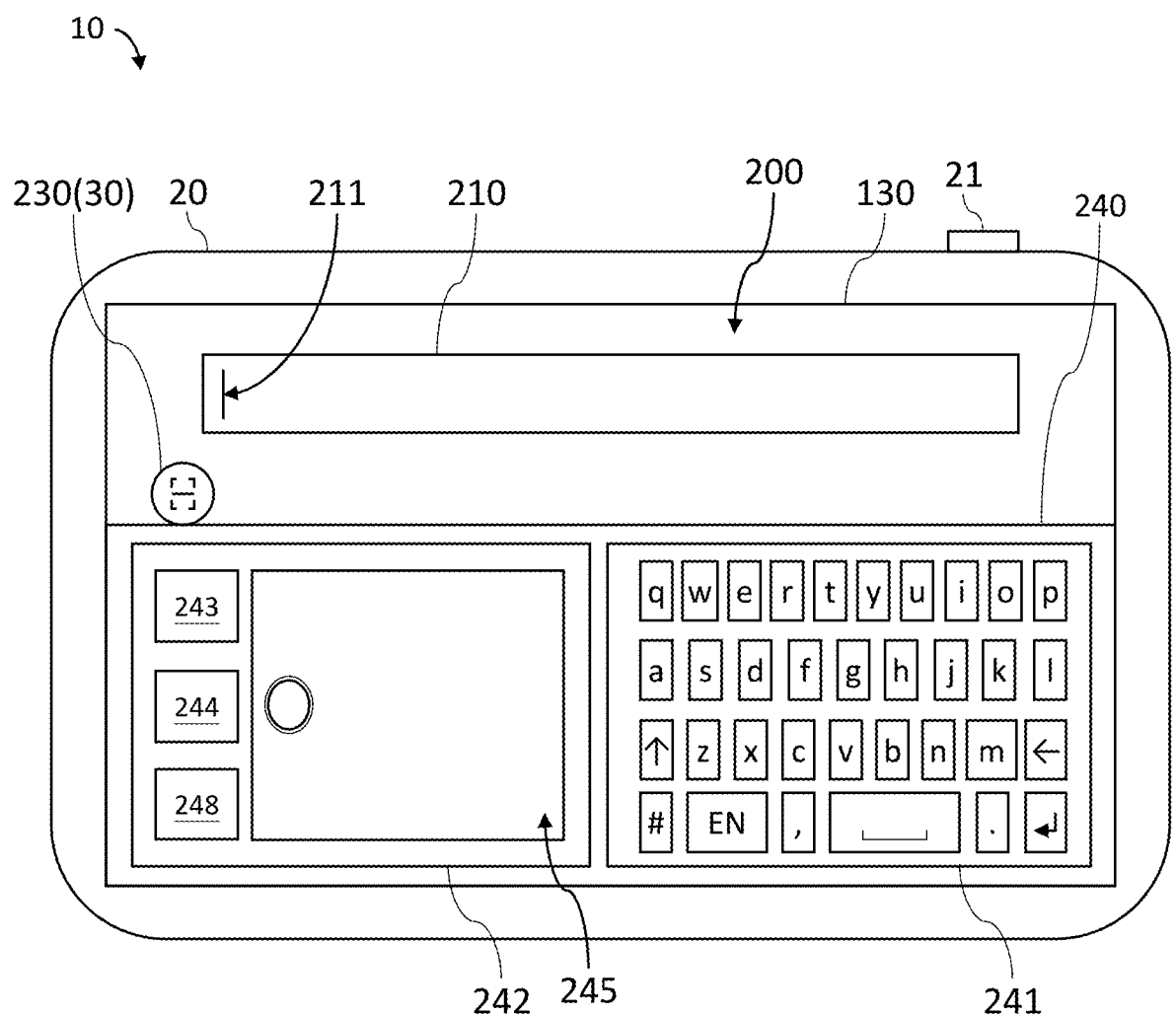
FIG. 6 illustrates a schematic view of an implementation of a trigger element in FIG. 2 after being processed via the step S120 in FIG. 4.
Figure 7:
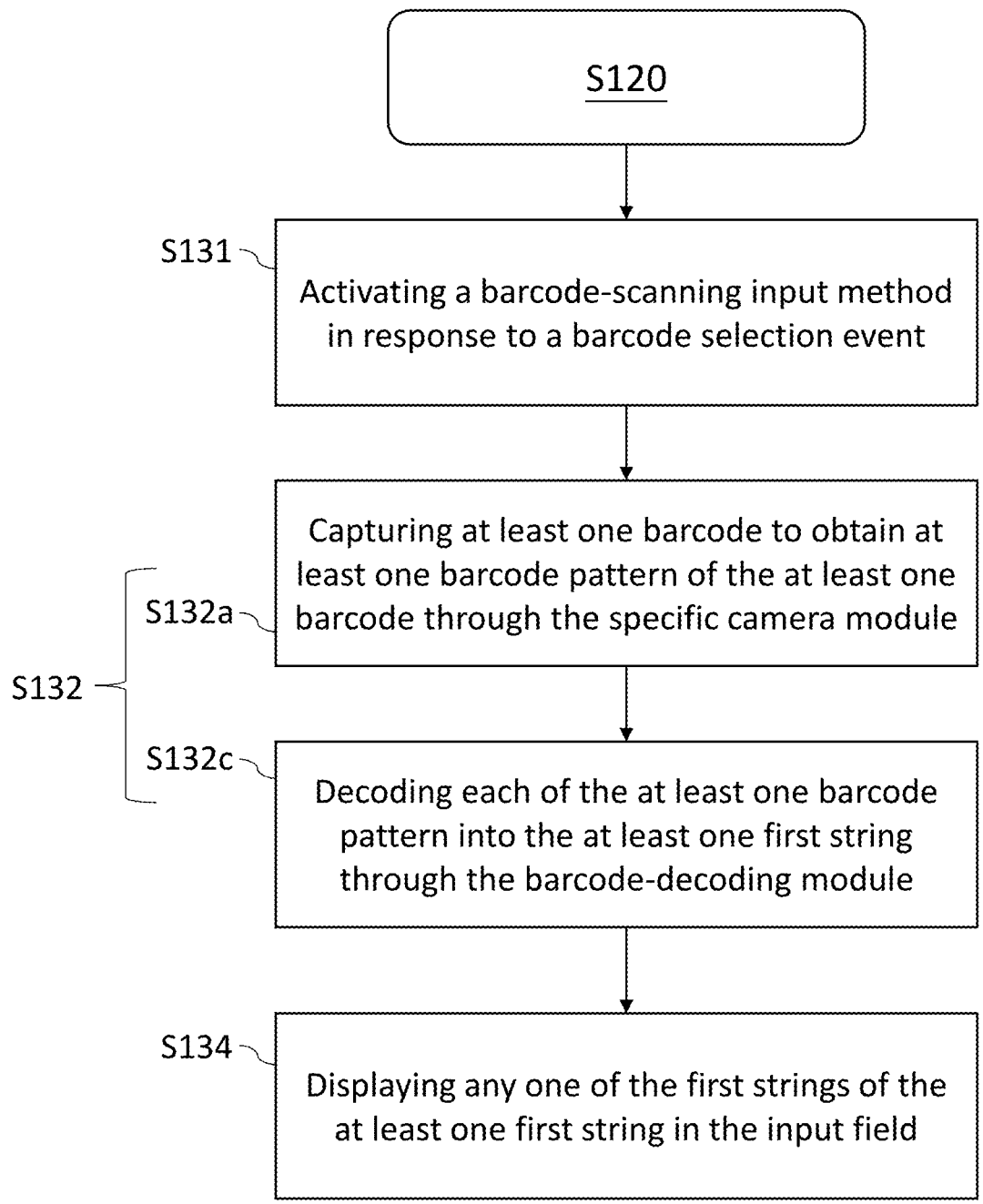
FIG. 7 illustrates a flow chart showing the operation of an implementation following the step S110 in FIG. 4.
Figure 8:
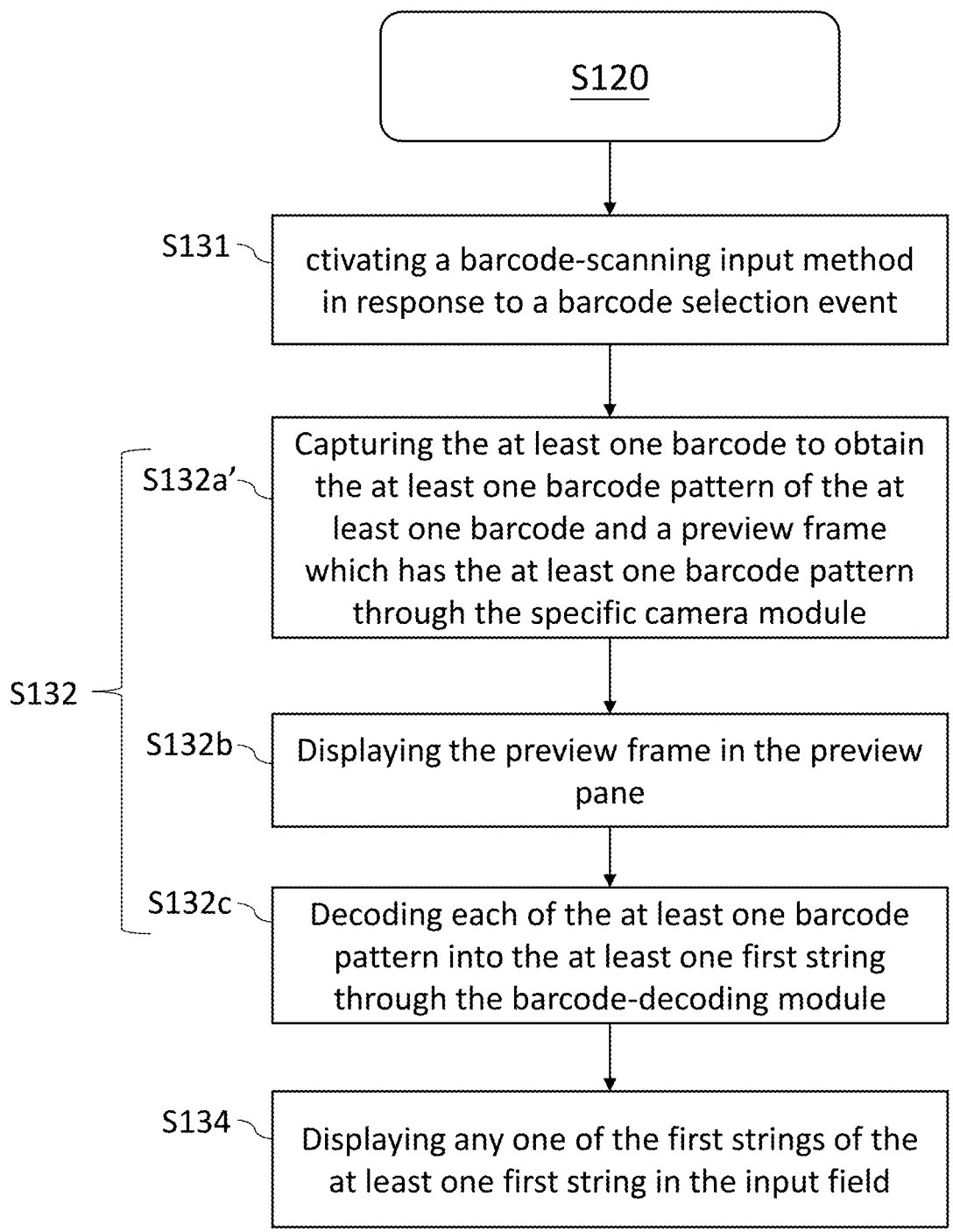
FIG. 8 illustrates a flow chart showing the operation of an implementation following the step S120 in FIG. 4.

After the step S110, the control module 140 switches the first overlapping window 220 which is displayed on the display frame 200 to a second overlapping window 240 in response to a first trigger event of the trigger element 30 (the step S120, as shown in FIG. 6). In some embodiments, the second overlapping window 240 has a self-defined keyboard 241 of the image conversion input method and a preview pane 242 of the image conversion input method arranged in parallel, and the preview pane 242 is linked to the general camera module 100 or the specific camera module 110.

In some embodiments, the self-defined keyboard 241 may be a text input keyboard with the same function as the virtual keyboard 221 (as shown in FIG. 6), and the self-defined keyboard 241 may also be other types of input keyboards, such as but not limited to a hand-writing input keyboard or a voice input keyboard (not shown). In some embodiments, the user can set the type of the self-defined keyboard 241 by himself/herself.

In some embodiments, if the trigger element 30 is a virtual button 230, the first trigger event may be that the user presses the virtual button 230 once or clicks the virtual button 230 continuously.

Take the input field 210 as the search bar on the main frame of the mobile device 10 as an example (as shown in FIG. 2). When a user clicks the input field 210 (i.e., an input trigger event occurs in the input field 210), the control module 140 controls the touch display module 130 to display a cursor 211 in the input field 210 in response to the click event of the user, and the first overlapping window 220 for the virtual keyboard 221 of the system default input method is emerged from the bottom of the display frame 200. Meanwhile, the virtual button 230 of the image conversion input method is displayed on any position in the display frame 200 floatingly or fixedly (as shown in FIG. 5). Then, when the user presses the virtual button 230 of the image conversion input method once (i.e., in this embodiment, the first trigger event), the touch display module 130 switches the first overlapping window 220 which is displayed on the display frame 200 to the second overlapping window 240 (as shown in FIG. 6).

Please refer to FIG. 6. In some embodiments, the mobile device 10 further includes at least one selection button 243, 244, and the image conversion input method includes a barcode-scanning input method. In other words, in some embodiments, the mobile device 10 has a barcode-scanning function.

Please refer to FIG. 1, FIG. 4, FIG. 6, and FIG. 7. In some embodiments, after the step S120, the control module 140 activates the barcode-scanning input method in response to a barcode selection event for one selection button 243 of the at least one selection button 243, 244 (the step S131). In other words, in some embodiments, the selection button 243 corresponds to the barcode-scanning function.

In some embodiments, the selection button 243 corresponding to the barcode-scanning function can be a physical button of the mobile device 10 (for example, one of the at least one physical button 21) or a virtual button on the second overlapping window 240. Take the selection button 243 being the virtual button as an example, the barcode selection event may be that the user clicks the virtual button (i.e., the selection button 243) once.

After the step S131, the mobile device 10 scans the at least one barcode through the barcode-scanning input method to obtain at least one first string (the step S132).

In some embodiments of the step S132, the specific camera module 110 captures the at least one barcode to obtain at least one barcode pattern 31 of the at least one barcode (the step S132a). Then, the at least one barcode pattern 31 will be transmitted to the barcode-decoding module 120, and the barcode-decoding module 120 decodes each of the at least one barcode pattern 31 into the at least one first string (the step S132c).

Figure 9:
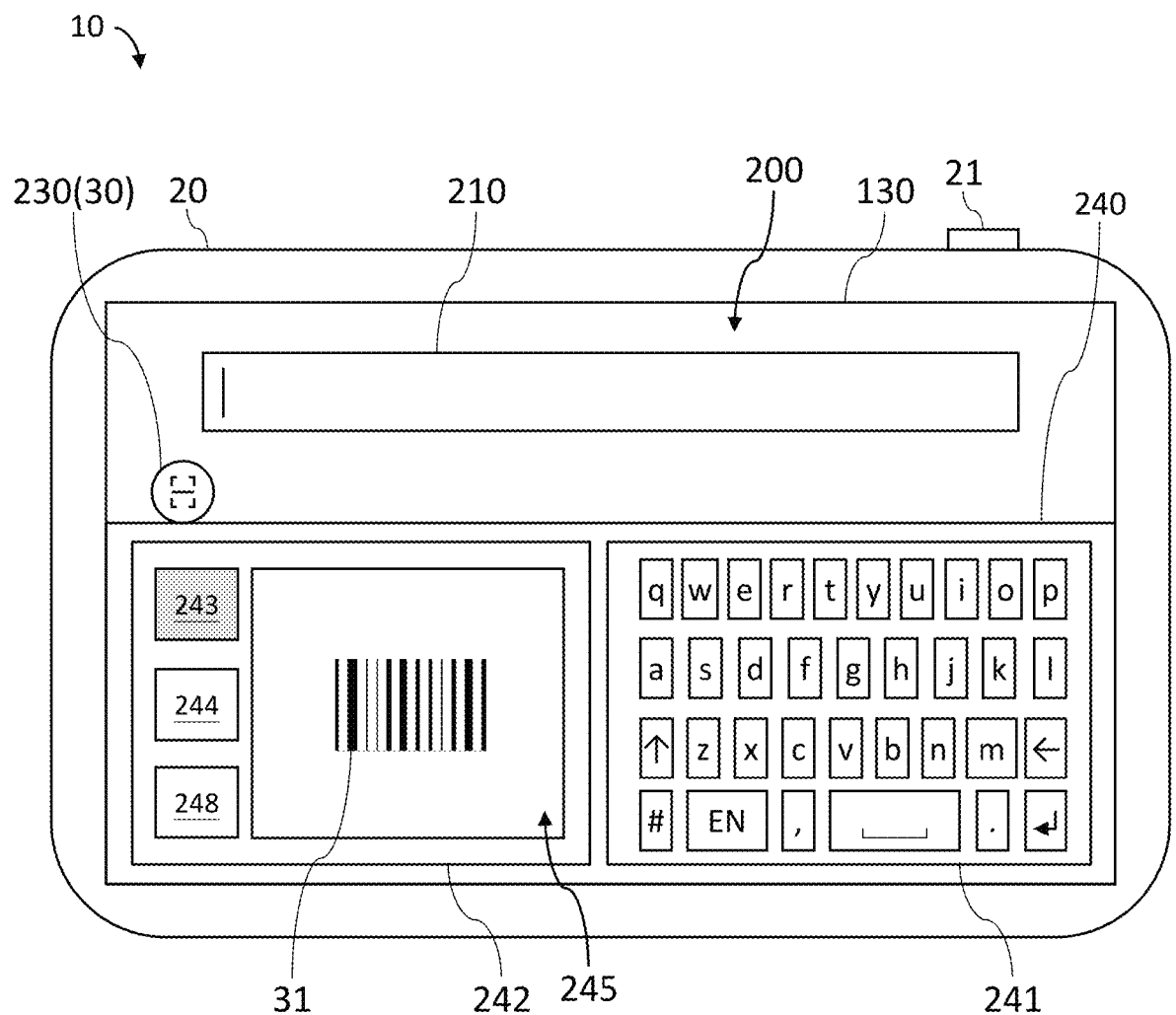
FIG. 9 illustrates a schematic view of an implementation of a preview pane in FIG. 6 after being processed via the step S132a' and the step S132b in FIG. 8.

Please refer to FIG. 1, FIG. 4, FIG. 6, and FIG. 8. In some other embodiments of the step S132, the specific camera module 110 captures the at least one barcode to obtain the at least one barcode pattern 31 of the at least one barcode and a preview frame 245 which has the at least one barcode pattern 31 (the step S132a'). Then, the control module 140 of the mobile device 10 controls the touch display module 130 to preview and display the preview frame 245 in the preview pane 242 in a real-time manner (the step S132b, as shown in FIG. 9) so as to facilitate the user to confirm the barcode aligned with the specific camera module 110. After that, the control module 140 transmits the at least one barcode pattern 31 to the barcode-decoding module 120, and the barcode-decoding module 120 decodes each of the at least one barcode pattern 31 into the at least one first string (the step S132c).

Figure 10:
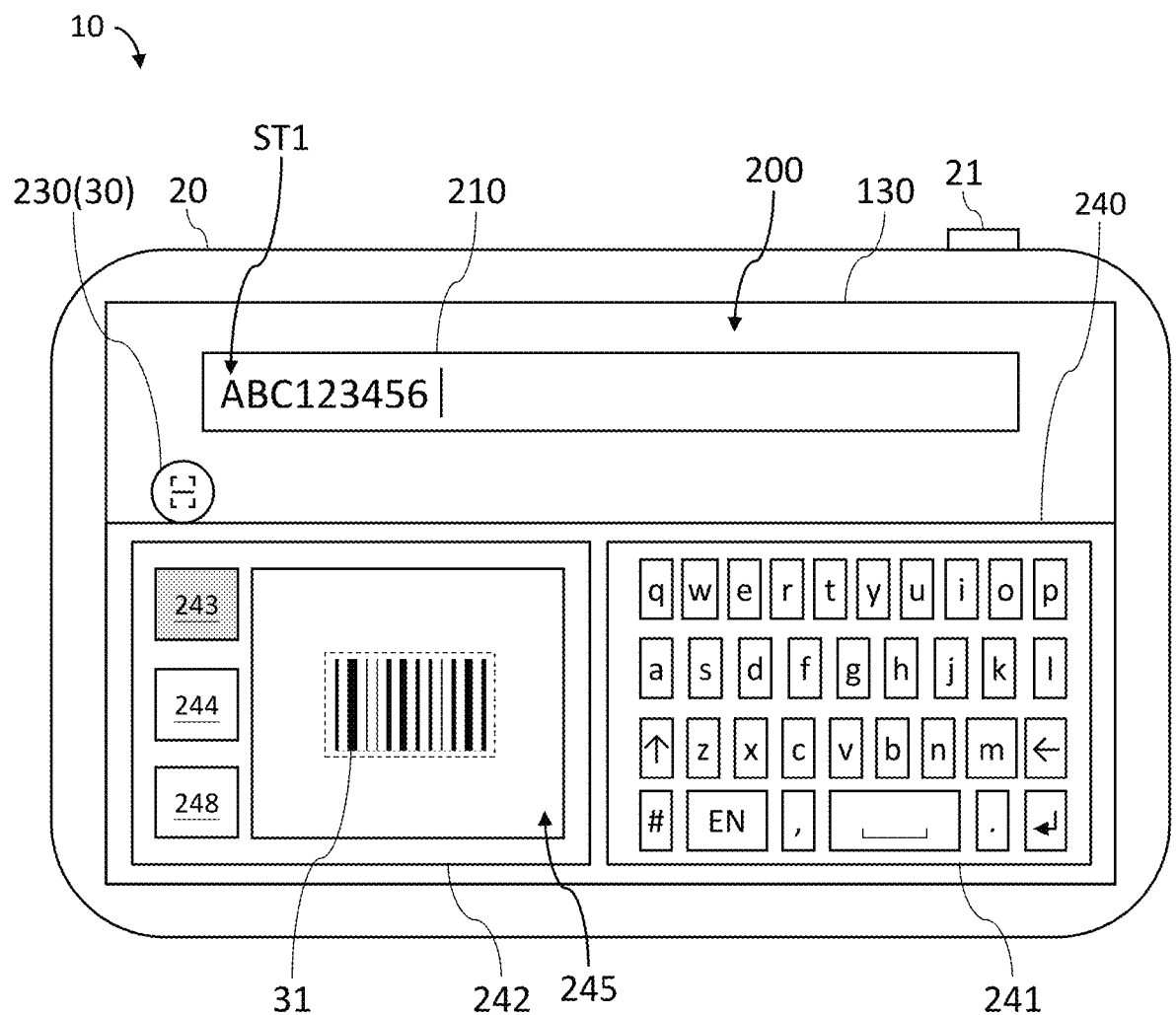
FIG. 10 illustrates a schematic view of an implementation of a preview pane in FIG. 6 after being processed via the step S132c and the step S134 in FIG. 8.

After the step S132, the control module 140 receives the first strings output by the barcode-decoding module 120 and controls the touch display module 130 to display any one of the first strings ST1 of the at least one first string in the input field 210 (the step S134, as shown in FIG. 10).

Take one barcode as an example, a barcode information carried by the barcode is "ABC123456". In this embodiment, the specific camera module 110 captures the barcode to obtain a barcode pattern 31 of the barcode, and the barcode-decoding module 120 decodes the obtained barcode pattern 31 to obtain the first string ST1 carrying "ABC123456".

In some embodiments, when the specific camera module 110 captures a plurality of barcodes at one time (i.e., the at least one barcode pattern includes a plurality of barcode patterns), the touch display module 130 displays the first string in the input field 210, wherein the first string is represented by the barcode pattern located at a specified position in the preview frame 245 (for example, the barcode pattern overlapping the center of the preview frame 245).

Figure 11:
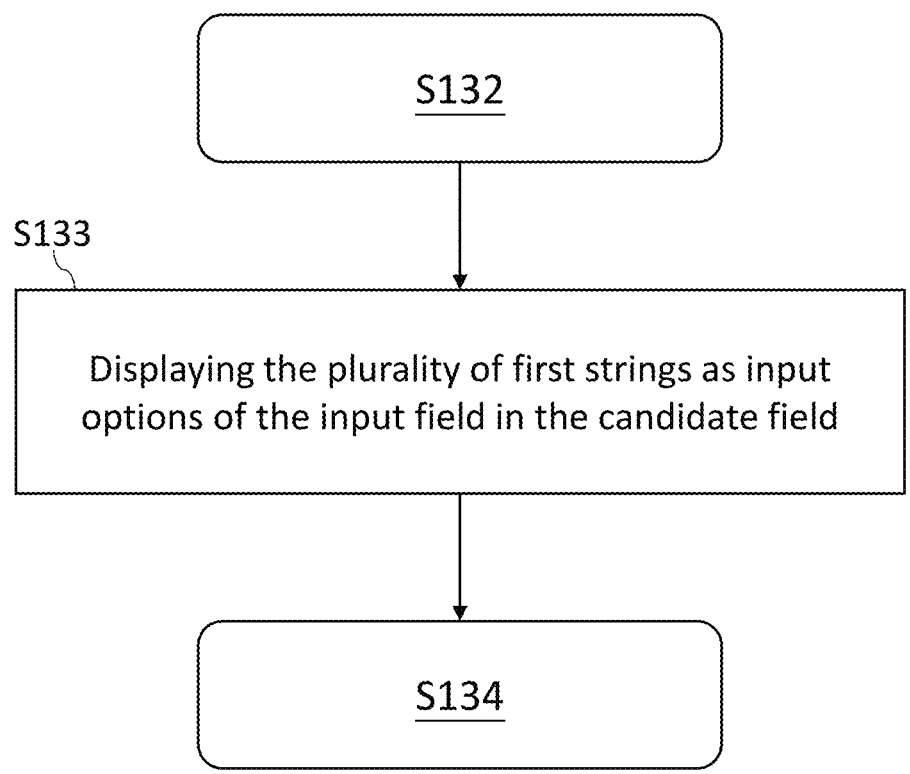
FIG. 11 illustrates a flow chart showing the operation of an embodiment following the step S132 in FIG. 8.
Figure 12:
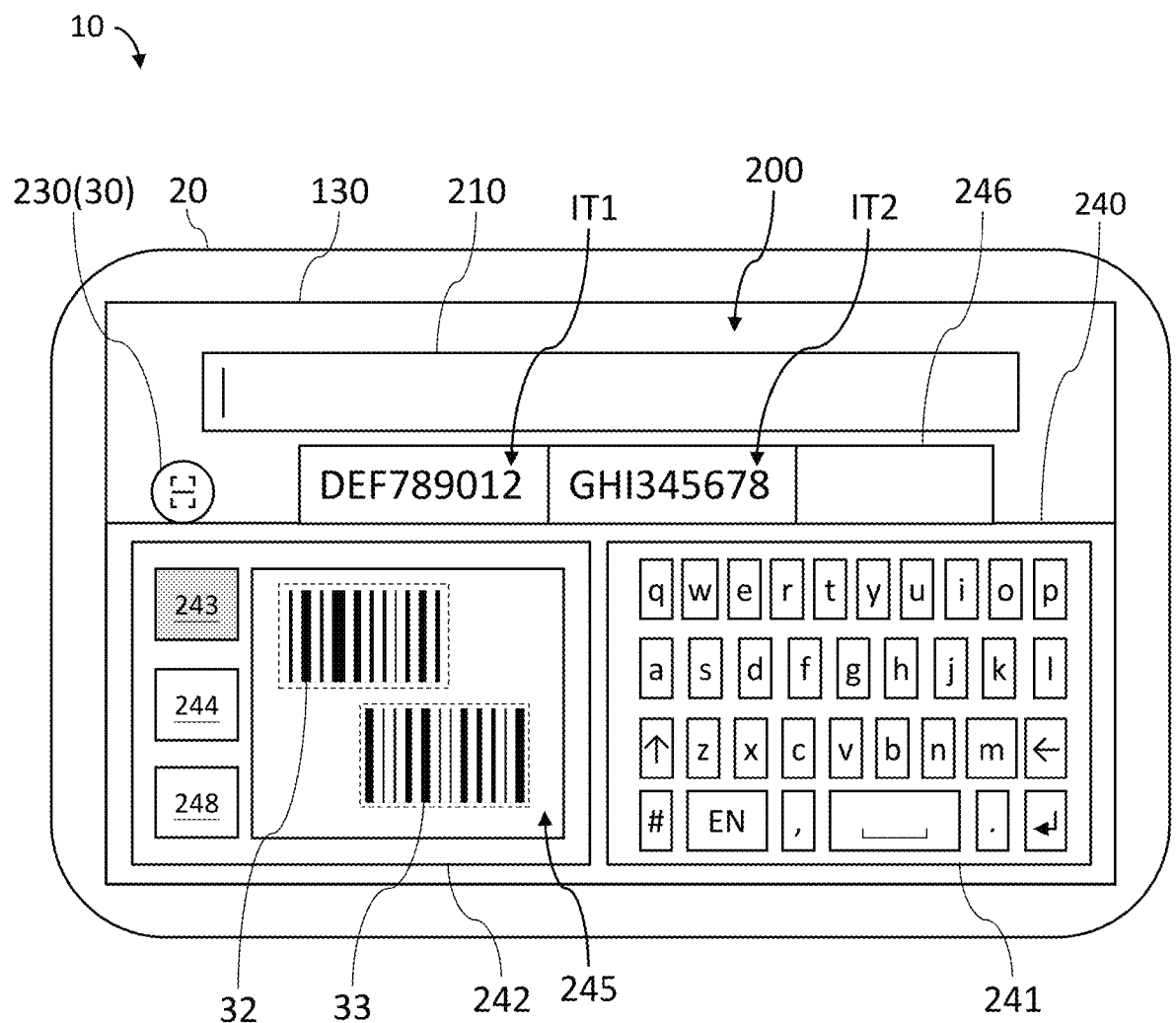
FIG. 12 illustrates a schematic view of an implementation of a preview pane in FIG. 9 after being processed via the step S134 in FIG. 11.

Please refer to FIG. 1, FIG. 4, FIG. 9, FIG. 11, and FIG. 12. In some embodiments, the at least one first string includes a plurality of first strings, and the second overlapping window 240 further has a candidate field 246. In some embodiments, the candidate field 246 is above the self-defined keyboard 241 and the preview pane 242 (as shown in FIG. 12). In other words, in some embodiments, the specific camera module 110 captures a plurality of barcodes at one time to obtain the plurality of barcode patterns 32, 33 correspondingly. At this moment, in the step S132c, the barcode-decoding module 120 decodes the barcode patterns 32, 33 of the plurality of barcodes into the plurality of first strings, and the control module 140 controls the touch display module 130 to display the plurality of first strings as input options IT1, IT2 of the input field 210 in the candidate field 246 (the step S133, as shown in FIG. 11).

Take that the specific camera module 110 captures two barcodes as an example (as shown in FIG. 12), barcode information carried by the two barcodes are "DEF789012" and "GHI345678", respectively. At this moment, the candidate field 246 has two input options IT1, IT2, wherein the input option IT1 is the first string "DEF789012" converted by the barcode pattern 32, and the other input option IT2 is the first string "GHI345678" converted by the barcode pattern 33. Specifically, in this embodiment, when the mobile device 10 captures the two barcode patterns 32, 33, the barcode-decoding module 120 decodes the two barcode patterns 32, 33 into the first string "DEF789012" and the first string "GHI345678", respectively. The two first strings are displayed in the candidate field 246 as input options IT1, IT2, so that one of the two first strings can be selected to be input into the input field 210.

Figure 13:
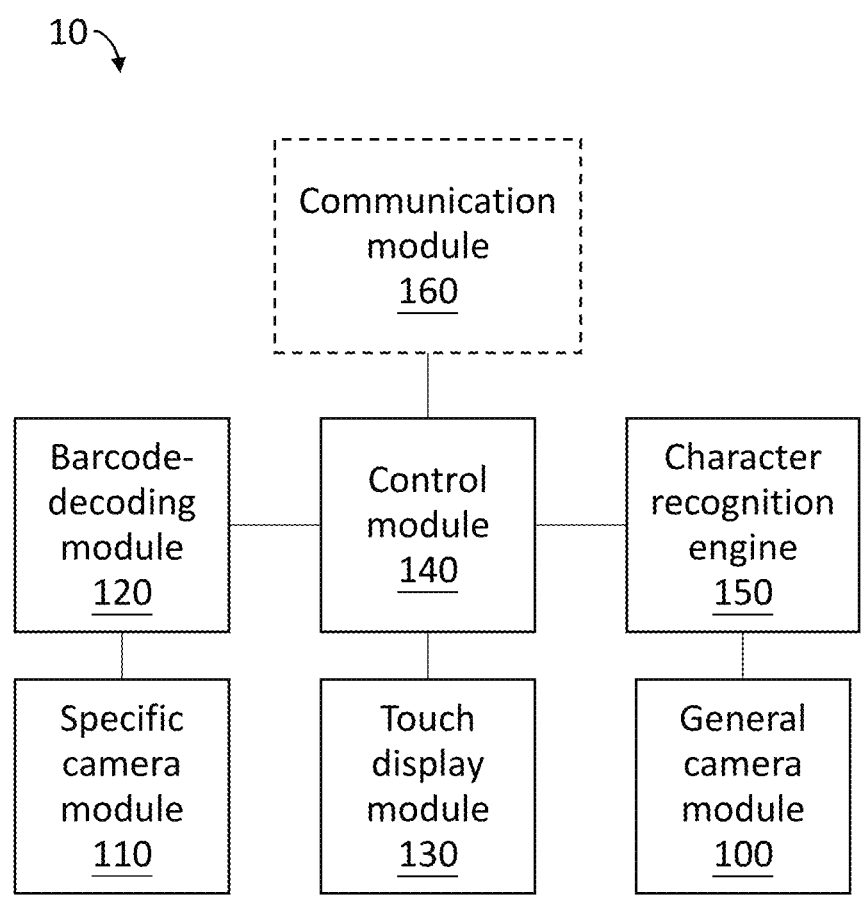
FIG. 13 illustrates a module block diagram of a second embodiment of a mobile device according to the present disclosure.

Please refer to FIG. 13. In some embodiments, the image conversion input method further includes a character recognition input method, and the mobile device 10 further includes a character recognition engine 150. In some embodiments, the character recognition 150 is electrically connected between the general camera module 100 and the control module 140 and is disposed in the housing 20 (not shown). In other words, in some embodiments, the mobile device 10 has an optical character recognition (OCR) function.

Figure 14:
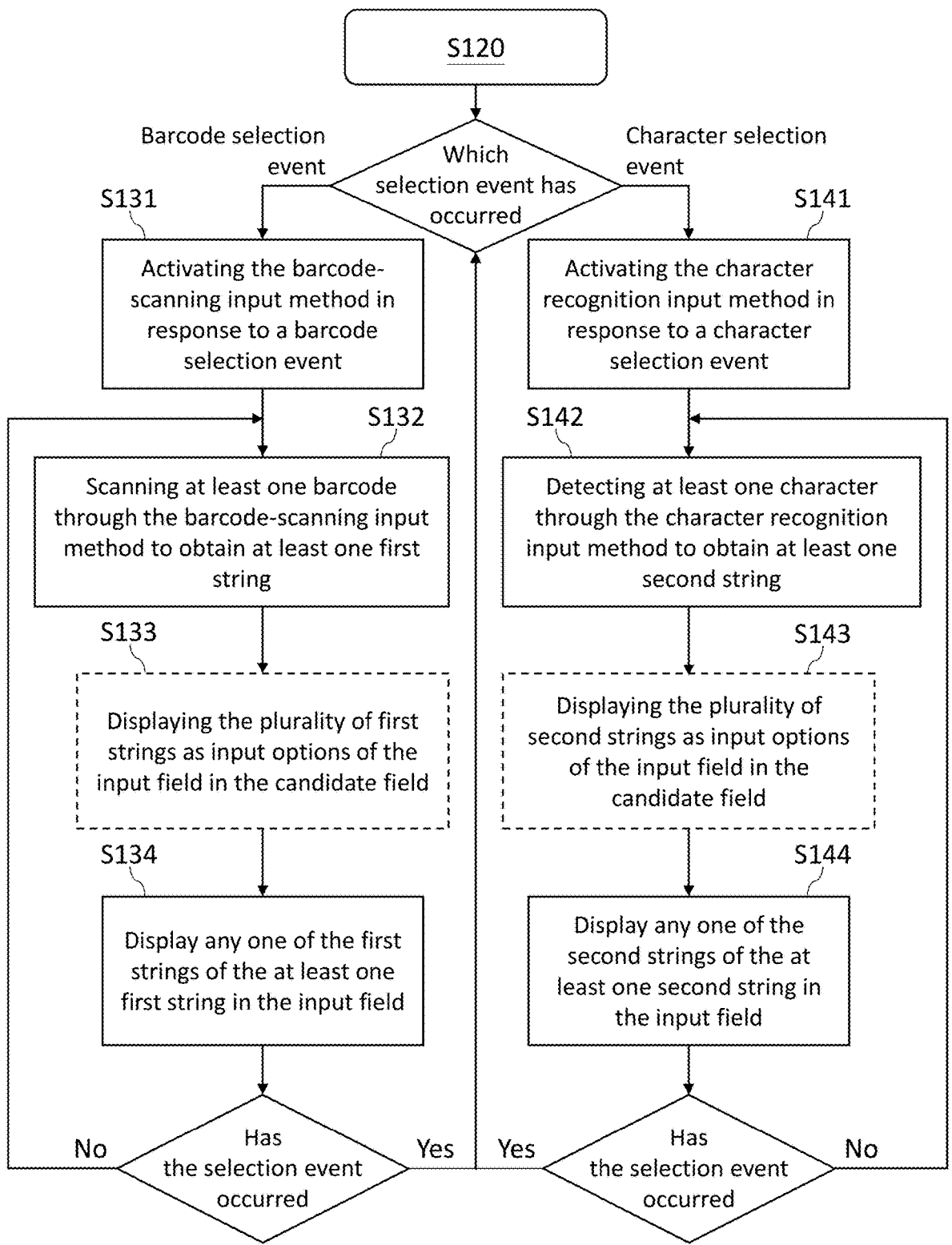
FIG. 14 illustrates a flow chart showing the operation of a third embodiment following the step S120 in FIG. 4.
Figure 15:
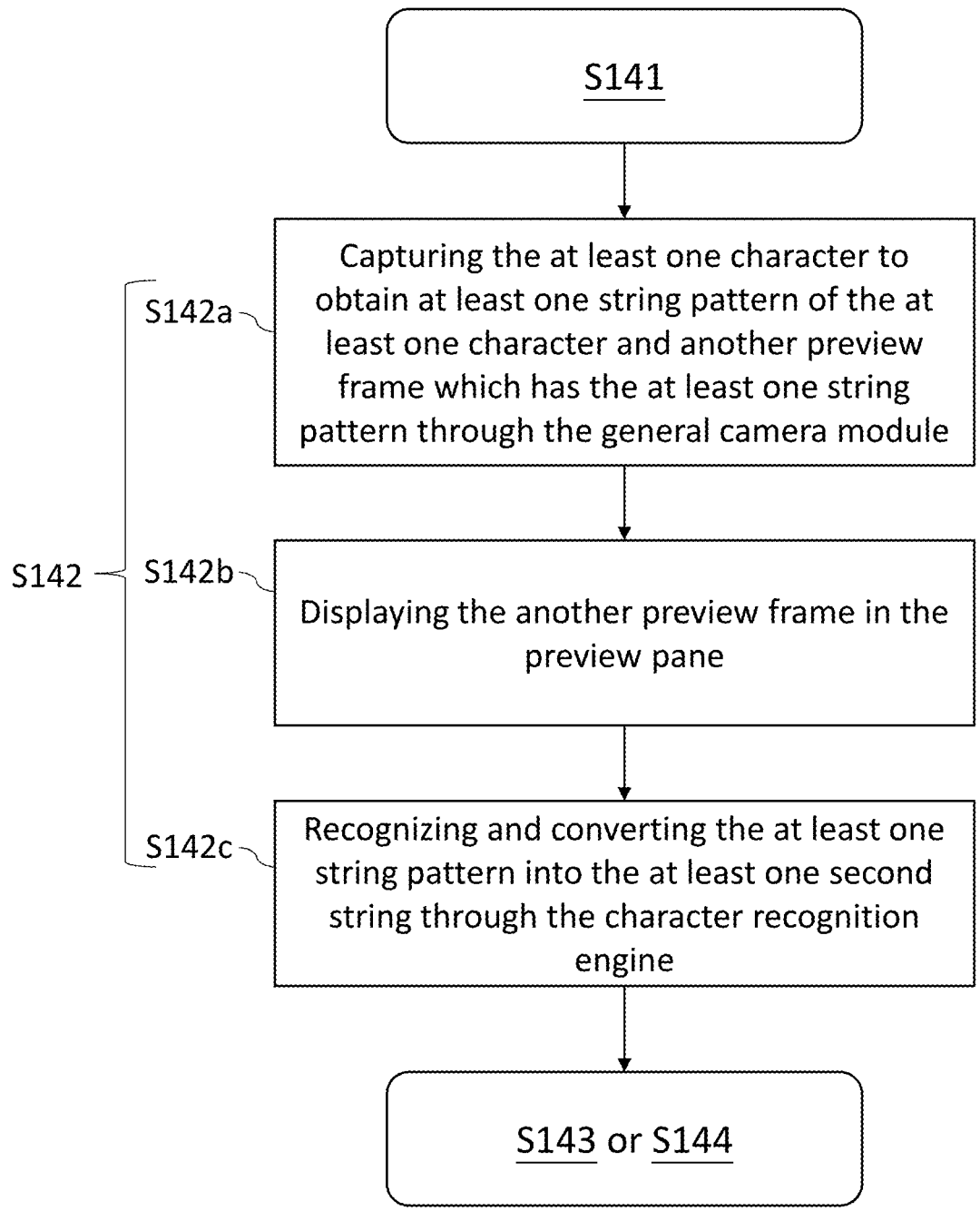
FIG. 15 illustrates a detailed flow chart of an embodiment of the step S142 in FIG. 14.

Please refer to FIG. 4, FIG. 13, and FIG. 14. In some embodiments, after the step S120 or the step S134, the control module 140 activates the character recognition input method in response to a character selection event for the other selection button 244 of the at least one selection button 243, 244 (the step S141). In other words, in some embodiments, the selection button 244 corresponds to the OCR function.

In some embodiments, the selection button 244 corresponding to the OCR function may be a physical button of the mobile device 10 (for example, one of the at least one physical button 21) or a virtual button on the second overlapping window 240. Take the selection button 244 being the virtual button as an example, the character selection event may be that the user clicks the virtual button (i.e., the selection button 244) one time.

In some embodiments, the selection button 243 corresponding to the barcode-scanning function and the selection button 244 corresponding to the OCR function are both physical buttons of the mobile device 10 (for example, any two of the plurality of physical buttons 21 of the mobile device 10) or are both virtual buttons on the second overlapping window 240 (as shown in FIG. 6). In some other embodiments, one of the selection buttons 243/244 is a physical button (for example, one of the at least one physical button 21) of the mobile device 10, and the other selection button 244/243 is a virtual button on the second overlapping window 240.

After the step S141, the mobile device 10 can detect at least one character to obtain at least one string (hereinafter referred to as second strings, the step S142) through the character recognition input method.

Figure 16:
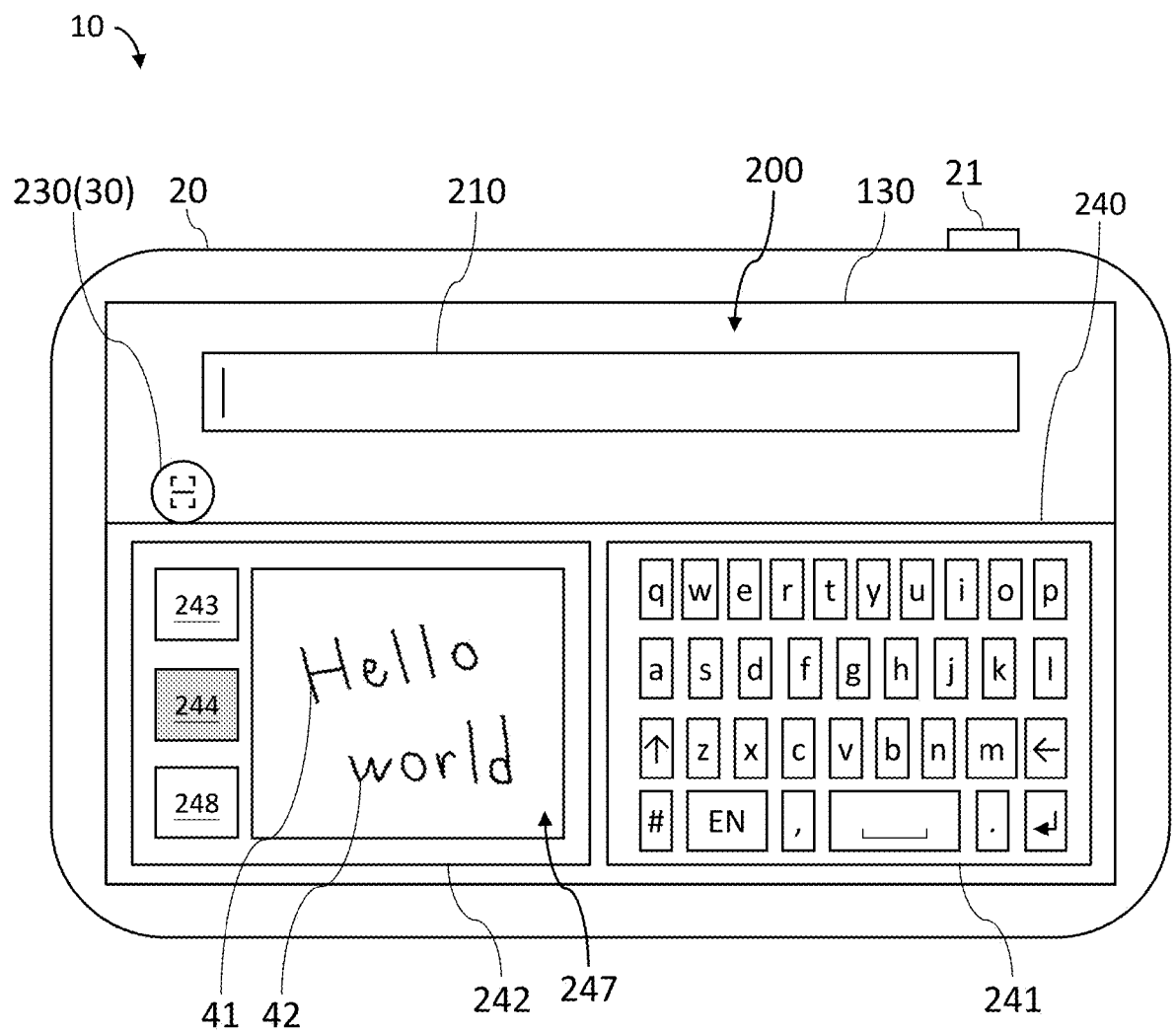
FIG. 16 illustrates a schematic view of an implementation of a preview pane in FIG. 6 after being processed via the step S142a and the step S142b in FIG. 15.
Figure 17:
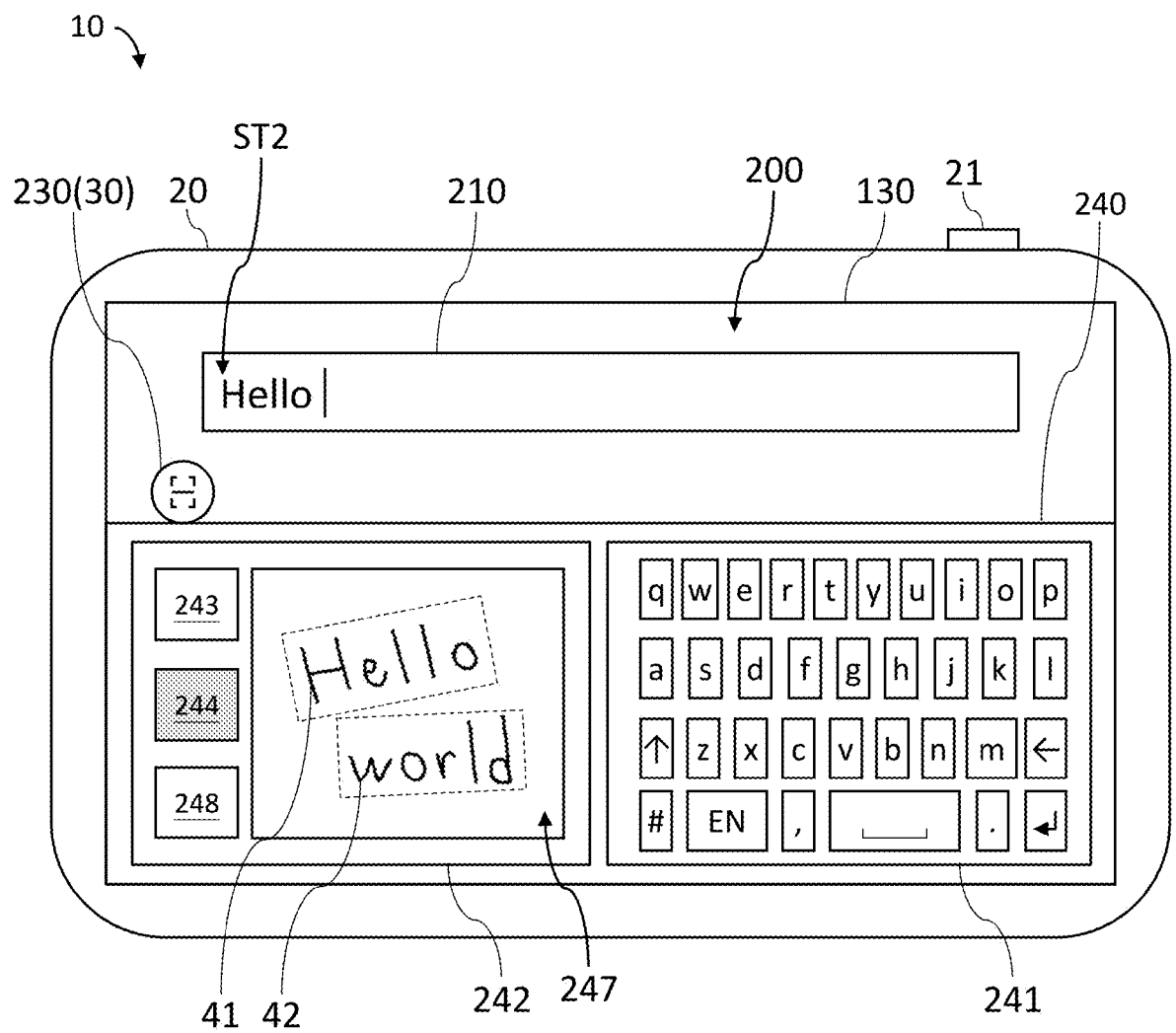
FIG. 17 illustrates a schematic view of an implementation of a preview pane in FIG. 6 after being processed via the step S143 and the step S144 in FIG. 14.

Please refer to FIG. 4 and FIG. 13 to FIG. 17. In some embodiments of the step S142, the general camera module 100 captures the at least one character to obtain at least one string pattern 41, 42 of the at least one character and another preview frame 247 which has the at least one string pattern 41, 42 (the step S142a, as shown in FIG. 16). Then, the control module 140 of the mobile device 10 controls the touch display module 130 to preview and to display the another preview frame 247 in the preview pane 242 in a real-time manner (the step S142b, as shown in FIG. 16). After that, the mobile device 10 recognizes and converts the at least one string pattern 41, 42 into the at least one second string through the character recognition engine 150 (the step S142c, as shown in FIG. 17).

Finally, the control module 140 controls the touch display module 130 to display any one of the second strings ST2 of the at least one second string in the input field 210 (the step S144, as shown in FIG. 17). Take two character patterns 41, 42 as an example, in the step S142c, the second string converted by the character pattern 41 is "Hello", and the second string converted by the character pattern 42 is "world". In addition, in the step S144, the second string ST2 which is "Hello" is displayed in the input field 210.

In some embodiments, when the at least one second string obtained in the step S142c includes a plurality of second strings, the control module 140 can control the touch display module 130 to display the plurality of second strings as input options of the input field 210 in the candidate field after the step S142c and before the step S144 (the step S143, not shown). After the user selects the second string ST2, the touch display module 130 displays the second string ST2 selected by the user in the input field 210 (the step S144, as shown in FIG. 17).

Figure 18:
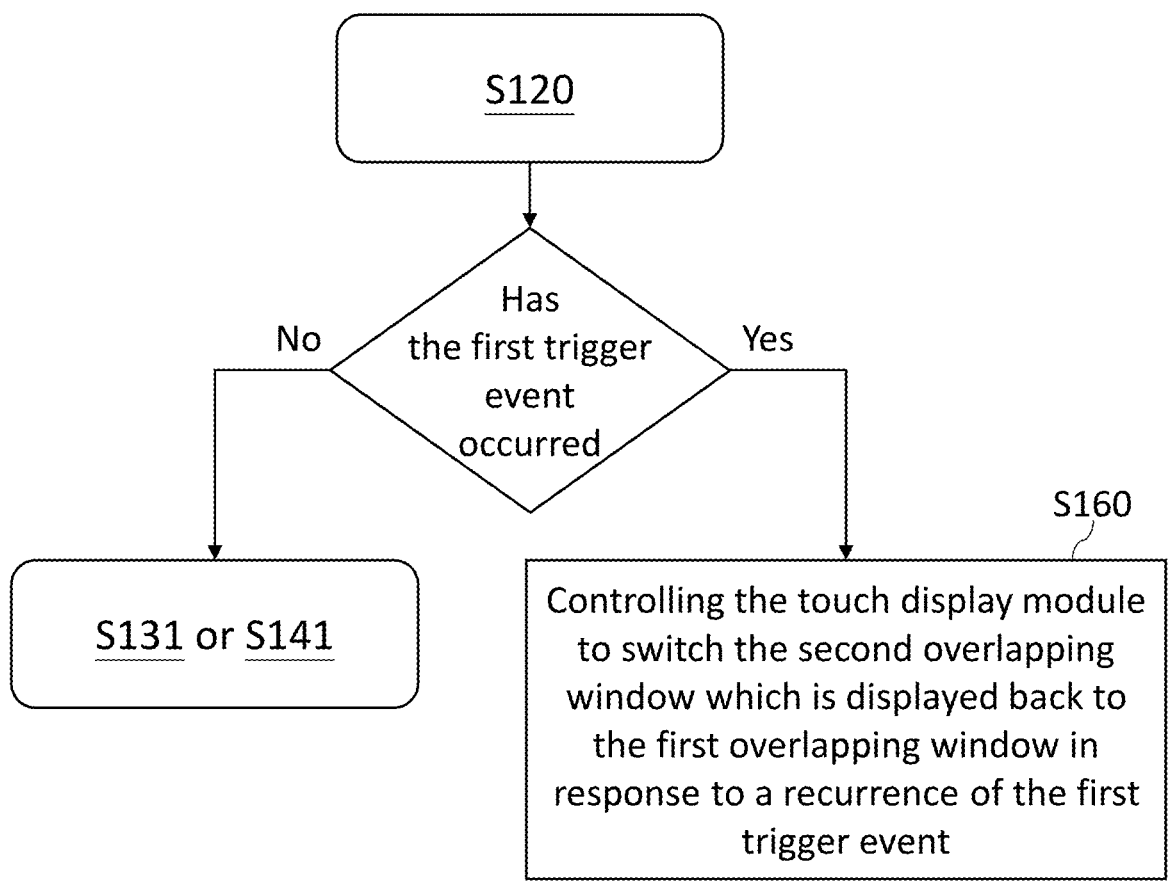
FIG. 18 illustrates a flow chart showing the operation of a fourth embodiment following the step S120 in FIG. 4.

Please refer to FIG. 1, FIG. 4, FIG. 13, and FIG. 18. In some embodiments, after the step S120, the control module 140 controls the touch display module 130 to switch the second overlapping window 240 which is displayed back to the first overlapping window 220 in response to a recurrence of the first trigger event (the step S160, as shown in FIG. 5). Following the previous example and taking that the first trigger event is a one-press operation as an example, when the second overlapping window 240 is displayed on the display frame 200 (as shown in FIG. 6, FIG. 9, FIG. 10, FIG. 12, FIG. 16, and FIG. 17) and the user presses the trigger element 30 again, the control module 140 can switch the second overlapping window 240 which is displayed to the first overlapping window 220 (as shown in FIG. 5). It should be understood that, the step S160 shown in FIG. 18 is performed after the step S120 in a real-time manner, but the order of the steps is not a limitation for the present disclosure. The step S160 can be performed before or after any step after the step S120 (for example, any one of the steps S131-S134 and S141-S144) under reasonable circumstances.

Figure 19:
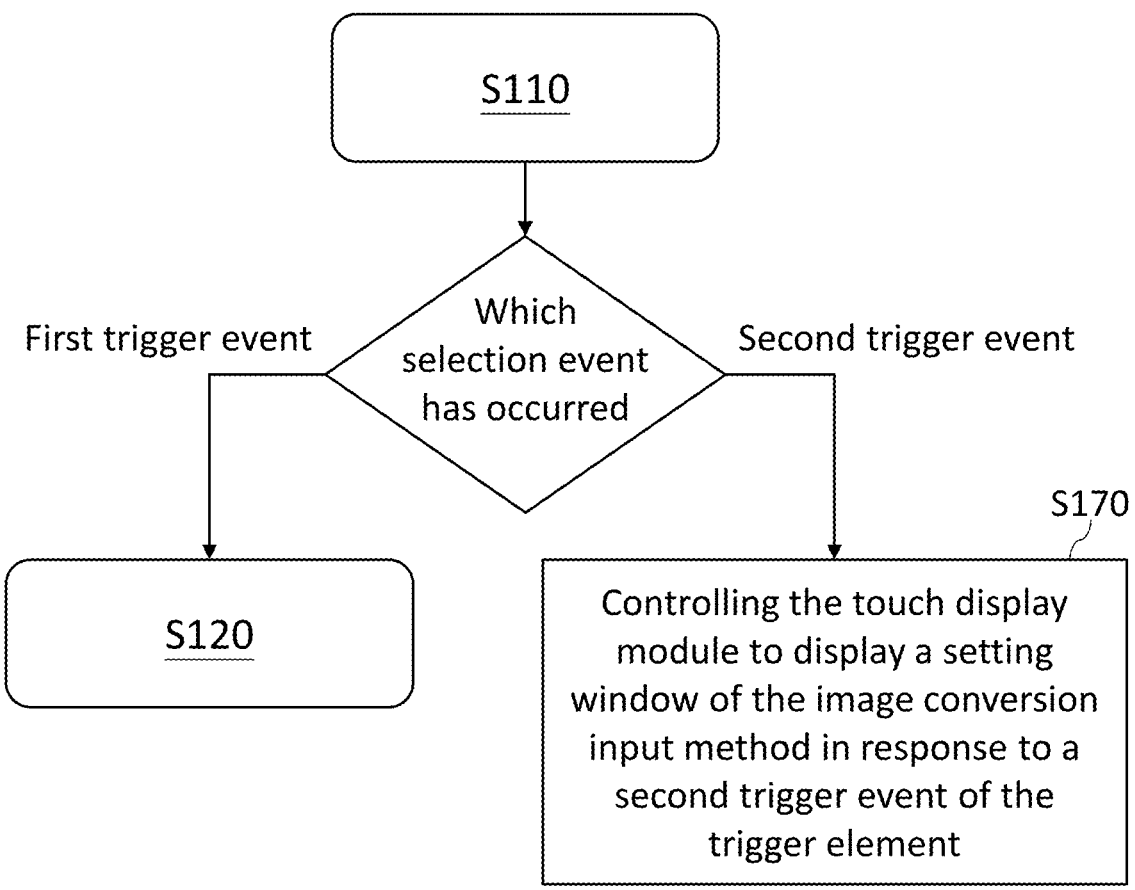
FIG. 19 illustrates a flow chart showing the operation of an embodiment following the step S110 in FIG. 4.
Figure 20:
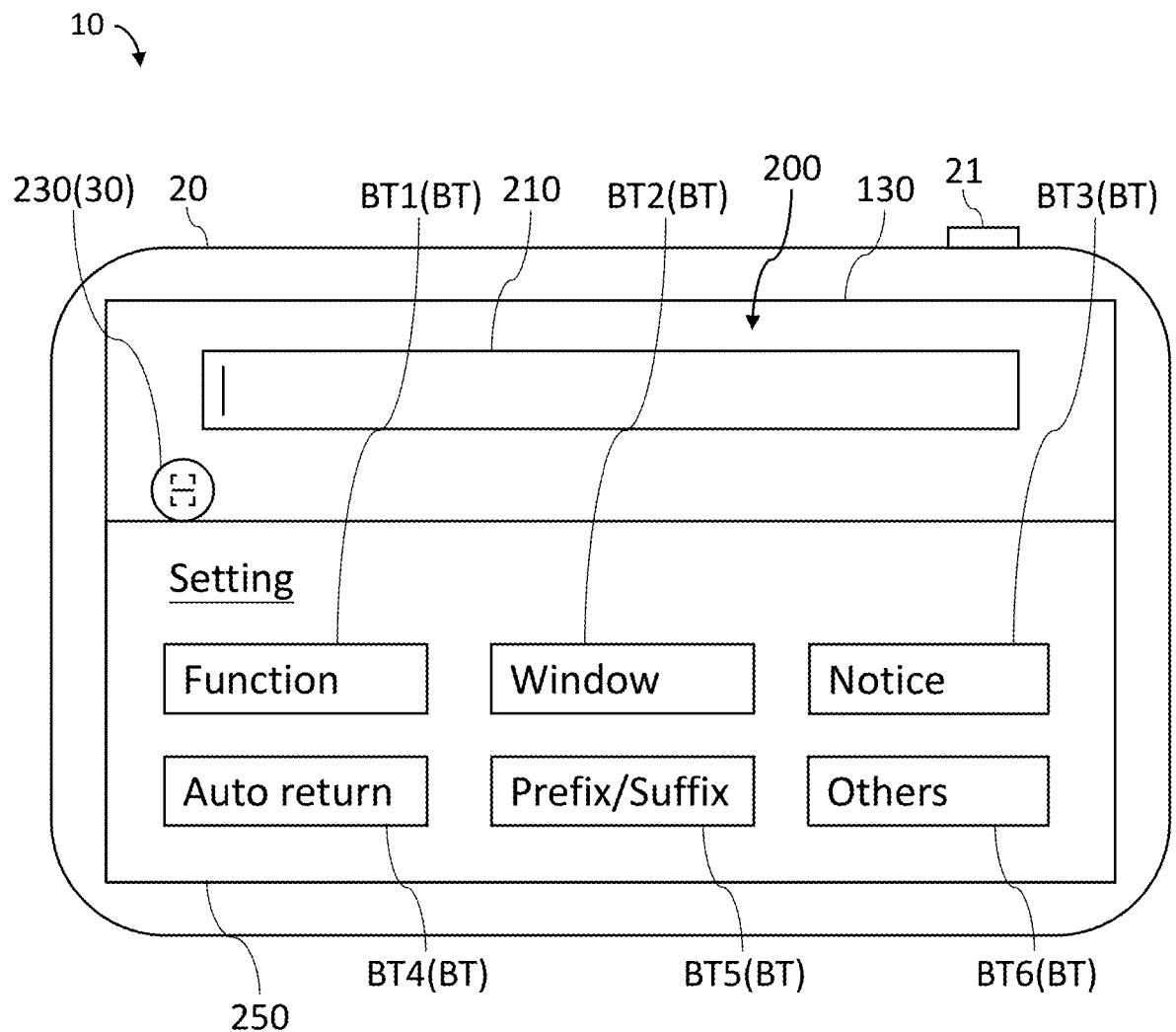
FIG. 20 illustrates a schematic view of an implementation of a trigger element in FIG. 6 after being processed via the step S170 in FIG. 19.

Please refer to FIG. 1, FIG. 4, FIG. 13, FIG. 19, and FIG. 20. In some embodiments, after the step S110, the control module 140 controls the touch display module 130 to display a setting window 250 of the image conversion input method in response to a second trigger event of the trigger element 30 (the step S170, as shown in FIG. 20). It should be understood that, the step S170 shown in FIG. 19 is performed after the step S110 in a real-time manner, but the order of the steps is not a limitation for the present disclosure. The step S170 can be performed before or after any step after the step S110 (for example, any one of the steps S120, S131-S134, S141-S144, and S160) under reasonable circumstances.

In some embodiments, the first trigger event and the second trigger event are different trigger events. In some embodiment, the first trigger event is a short press operation, and the second trigger event is a long press operation. In some embodiments, the short press operation is, for example, a single press or an operation that presses for 1 second and releases, and the present disclosure is not limited thereto. The long press operation is, for example, an operation that presses for more than 3 seconds, and the present disclosure is not limited thereto.

In some embodiments, the mobile device 10 can adjust the image conversion input method and various functions of the preview pane 242 of the image conversion input method through the setting window 250.

Please refer to FIG. 20. In some embodiments, the setting window 250 has a plurality of virtual buttons BT, and each of the plurality of virtual buttons BT has a corresponding setting or a corresponding function. For example, the button BT1 of "function" is configured to adjust detailed settings of the OCR function, the QR code scanning function, and the barcode-scanning function (for example, an automatic/manual function setting of barcode-scanning function). The button BT2 of "Windows" is configured to set the size of the preview pane 242 and the position of the preview pane 242. The button BT3 of "Notice" is configured to set a switch of sound notification and/or a switch of vibration notification when the recognition operation or the scanning operation is successful. The button BT4 of "Prefix/Suffix" is configured to set a switch for adding a prefix/suffix string before and after the at least one first string. The button BT5 of "Auto return" is configured to set a switch for hiding the preview pane 242 automatically or manually after the recognition operation or the scanning operation is successful. The button BT6 of "Others" is configured to perform other detailed settings related to the preview pane 242 (for example, appearance settings, such as language or background). In other words, in some embodiments, any function which is related to the image conversion input method and the self-defined keyboard 241 and the preview pane 242 of the image conversion input method (for example, the type of the aforementioned self-defined keyboard 241) can be provided in the setting window 250 for users to perform self-defined settings, such as setting buttons, options, or any combination thereof.

Figure 21:
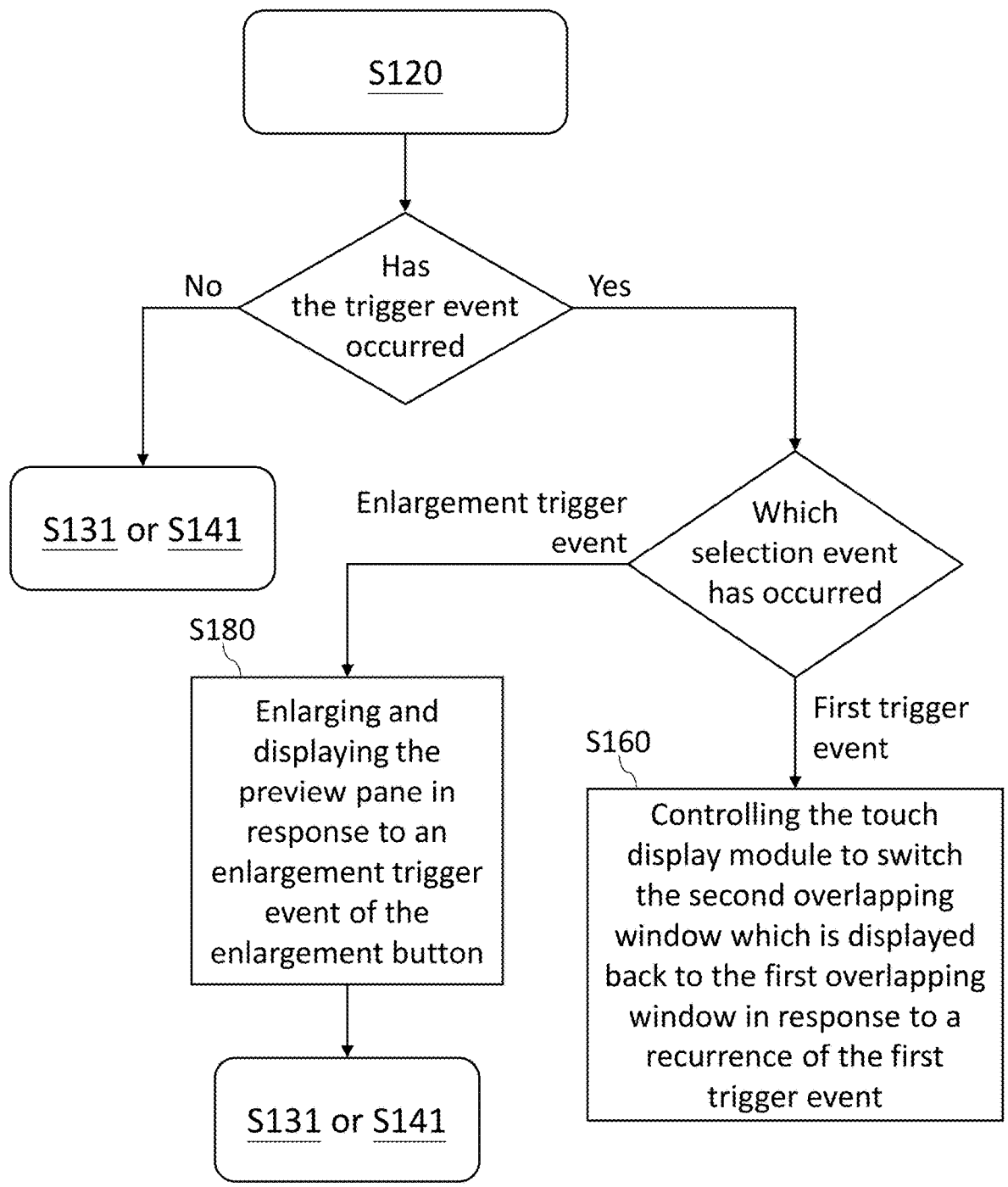
FIG. 21 illustrates a flow chart showing the operation of a fifth embodiment following the step S120 in FIG. 4.

Please refer to FIG. 1, FIG. 4, FIG. 6, FIG. 13, FIG. 21, and FIG. 22. In some embodiments, the second overlapping window 240 may include an enlargement button 248. After the step S120, the control module 140 controls the touch display module 130 to enlarge and display the preview pane 242 in response to an enlargement trigger event (for example, the enlargement button 248 is pressed and selected) of the enlargement button 248 (the step S180, as shown in FIG. 21). It should be understood that, the step S180 shown in FIG. 21 is performed after the step S120 in a real-time manner, but the order of the steps is not a limitation for the present disclosure. The step S180 can be performed before or after any step after the step S120 (for example, any one of the steps S131-S134 and S141-S144) under reasonable circumstances.

Figure 22:
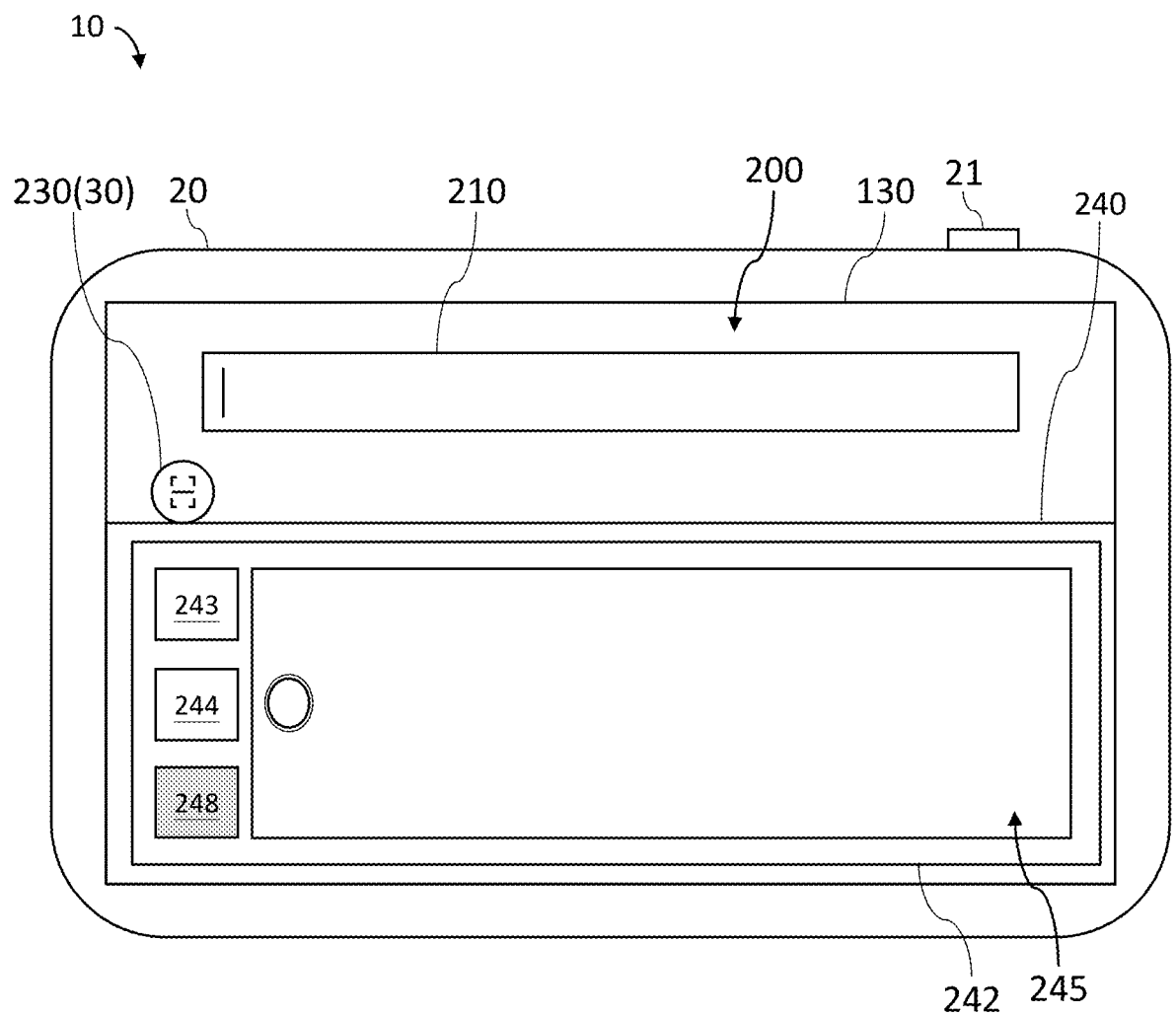
FIG. 22 illustrates a schematic view of an implementation of a preview pane in FIG. 6 after being processed via the step S180 in FIG. 21.

In some embodiments in the step S180, the control module 140 controls the touch display module 130 to display the preview pane 242 in full screen in response to the enlargement trigger event of the enlargement button 248. In some embodiments, the second overlapping window 240 has a first size, the preview pane 242 before enlarging has a second size, and the preview pane 242 after enlarging has a third size. In some embodiments, the second size is less than the first size, the third size is greater than the second size, and the third size is less than or equal to the first size. In some embodiments, the second size and/or the third size of the preview pane 242 can be set through the setting window 250 of the image conversion input method. For example, the third size of the preview pane 242 is substantially equal to the first size of the second overlapping window 240 (as shown in FIG. 22). In other words, in some embodiments, the second overlapping window 240 may only have the preview pane 242 without the self-defined keyboard 241. In some embodiments, the user can set the second overlapping window 240 to have the self-defined keyboard 241 and the preview pane 242 arranged in parallel through the setting window 250 of the image conversion input method (as shown in FIG. 6), or set the second overlapping window 240 to only have the preview pane 242 (as shown in FIG. 22).

In some embodiments, the trigger element 30 is a physical button. Please refer to FIG. 1, FIG. 4, FIG. 13 to FIG. 15, FIG. 23, and FIG. 24. In some implementations, the trigger element 30 may be one of the at least one physical button 21 (hereinafter referred to as physical button 21) disposed on the body of the mobile device 10 (i.e., in some embodiments, the physical button 21 is embedded on the housing 20), and the physical button 21 is electrically connected to the control module 140 (as shown in FIG. 2).

Figure 23:
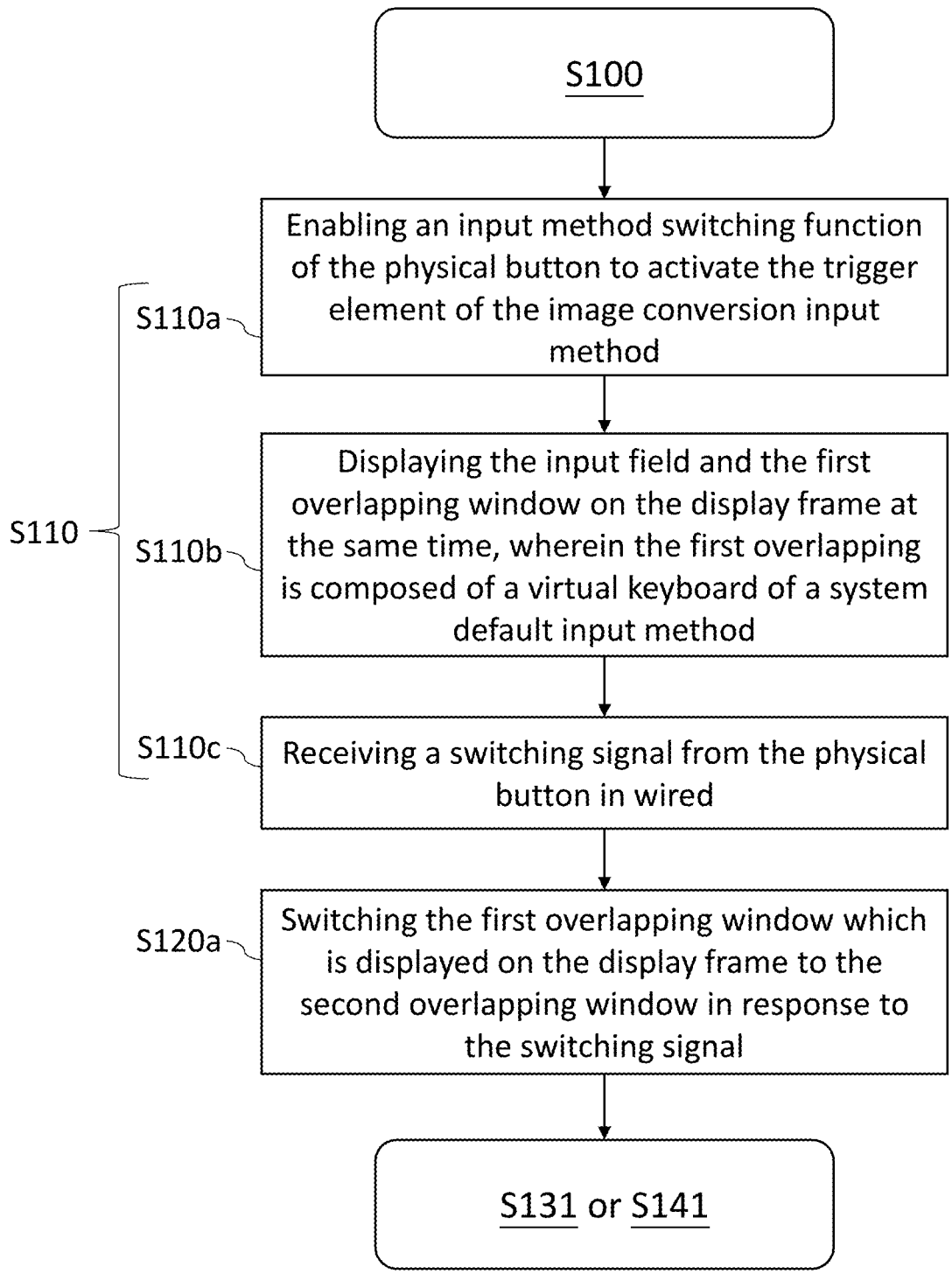
FIG. 23 illustrates a flow chart showing the operation of a first embodiment following the step S100 in FIG. 4.

In some embodiments of the step S110, the control module 140 enables an input method switching function of the physical button 21 in response to the input trigger event of the input field 210 (i.e., activating the trigger element 30 of the image conversion input method through the input field 210, the step S110*a*), and the control module 140 controls the touch display module 130 to display the input field 210 and the first overlapping window 220 on the display frame 200 at the same time (the step S110*b*). After the step S110*b*, the control module 140 of the mobile device 10 receives a switching signal from the physical button 21 in wired (the step S110*c*), and in response to the switching signal, the control module 140 switches the first overlapping window 220 which is displayed on the display frame 200 to the second overlapping window 240 (the step S120*a*). It should be understood that, the steps S110, S120*a* shown in FIG. 23 are performed after the step S100 in a real-time manner, but the order of the steps is not a limitation for the present disclosure. The steps S110, S120*a* can be performed before or after any step after the step S100 (for example, any one of the steps S131-S134 and S141-S144) under reasonable circumstances.

In some embodiments of the step S110*a*, when the input field 210 is clicked (i.e., the input trigger event occurs) so that the cursor 211 appears in the input field 210, the input field 210 generates an activating signal to notify the control module 140 to occur the input trigger event. The control module 140 enables the input method switching function of the predetermined physical button 21 in response to the received activating signal. In other words, in some embodiments, before the physical button 21 enables the input method switching function, any press or click event on the physical button 21 will not cause the control module 140 to control the touch display module 130 to display the input field 210 and the first overlapping window 220 on the display frame 200 at the same time, and the touch display module 130 keeps displaying the first overlapping window 220 on the display frame 200.

In some other implementations, the trigger element 30 may be a physical button disposed on a peripheral component of the body of the mobile device 10 (i.e., in some embodiments, the physical button is embedded on a component which is separated from the body but matched with the body, for example, the physical button is embedded on the housing of a control element).

Figure 25:
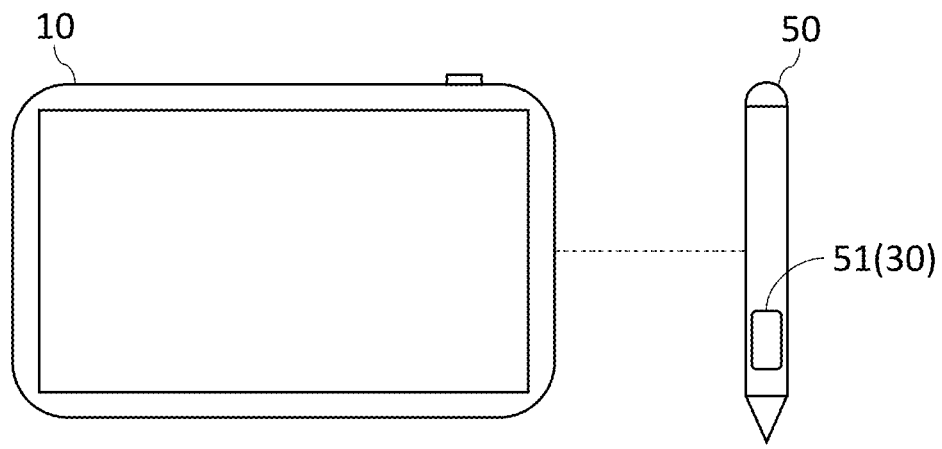
FIG. 25 illustrates a schematic view of an implementation of a mobile device in FIG. 1 or FIG. 13 and a control element.

Please refer to FIG. 1, FIG. 4, FIG. 13 to FIG. 15, FIG. 25, and FIG. 26, in some embodiments, the mobile device 10 further includes a communication module 160 and a control element 50 (as shown in FIG. 1 and FIG. 25), and the trigger element 30 is a physical button 51 on the control element 50. In some embodiments, the communication module 160 is electrically connected to the control module 140, and the control element 50 is wirelessly connected to the communication module 160. In some embodiments, the communication module 160 is disposed inside the housing 20 of the mobile device 10 (not shown in FIG. 25).

Figure 26:
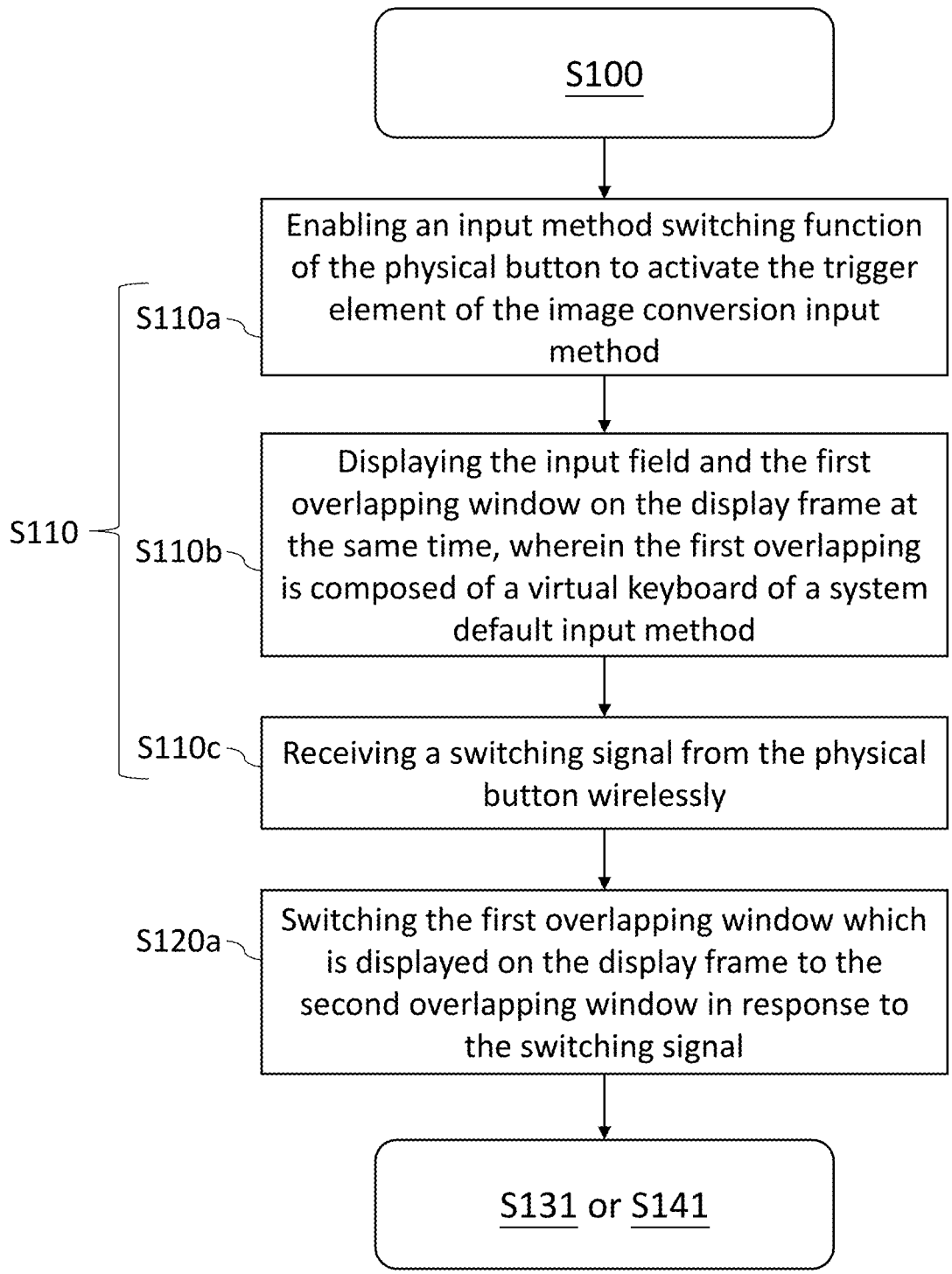
FIG. 26 illustrates a flow chart showing the operation of a second embodiment following the step S100 in FIG. 4.

In some embodiments of the step S110, the control module 140 enables an input method switching function of the physical button 51 to activate the trigger element 30 of the image conversion input method in response to the input trigger event (the step S110*a*), and the control module 140 controls the touch display module 130 to display the input field 210 and the first overlapping window 220 on the display frame 200 at the same time (the step S110*b*). After the step S110*b*, the communication module 160 of the mobile device 10 receives a switching signal from the physical button 51 on the control element 50 wirelessly (the step S110*d*) and transmits the switching signal to the control module 140. Then, the control module 140 of the mobile device 10 switches the first overlapping window 220 which is displayed on the display frame 200 to the second overlapping window 240 in response to the switching signal (the step S120*a*). It should be understood that, the steps S110, S120*a* shown in FIG. 26 are performed after the step S100 in a real-time manner, but the order of the steps is not a limitation for the present disclosure. The steps S110, S120*a* can be performed before or after any step after the step S100 (for example, any one of the steps S131-S134 and S141-S144) under reasonable circumstances.

In some embodiments, the user can control the control element 50 to generate the switching signal through a switching trigger event, wherein the switching trigger event is, for example, a one-press operation on the physical button 51 or a long press operation on the physical button 51, and the present disclosure is not limited thereto. In some embodiments, the user can set the switching trigger event through the setting window 250.

In some embodiments, the trigger element 30 is a specified gesture, and the control module 140 enables a gesture detection input function of the specified gesture to activate the trigger element 30.

Figure 27:
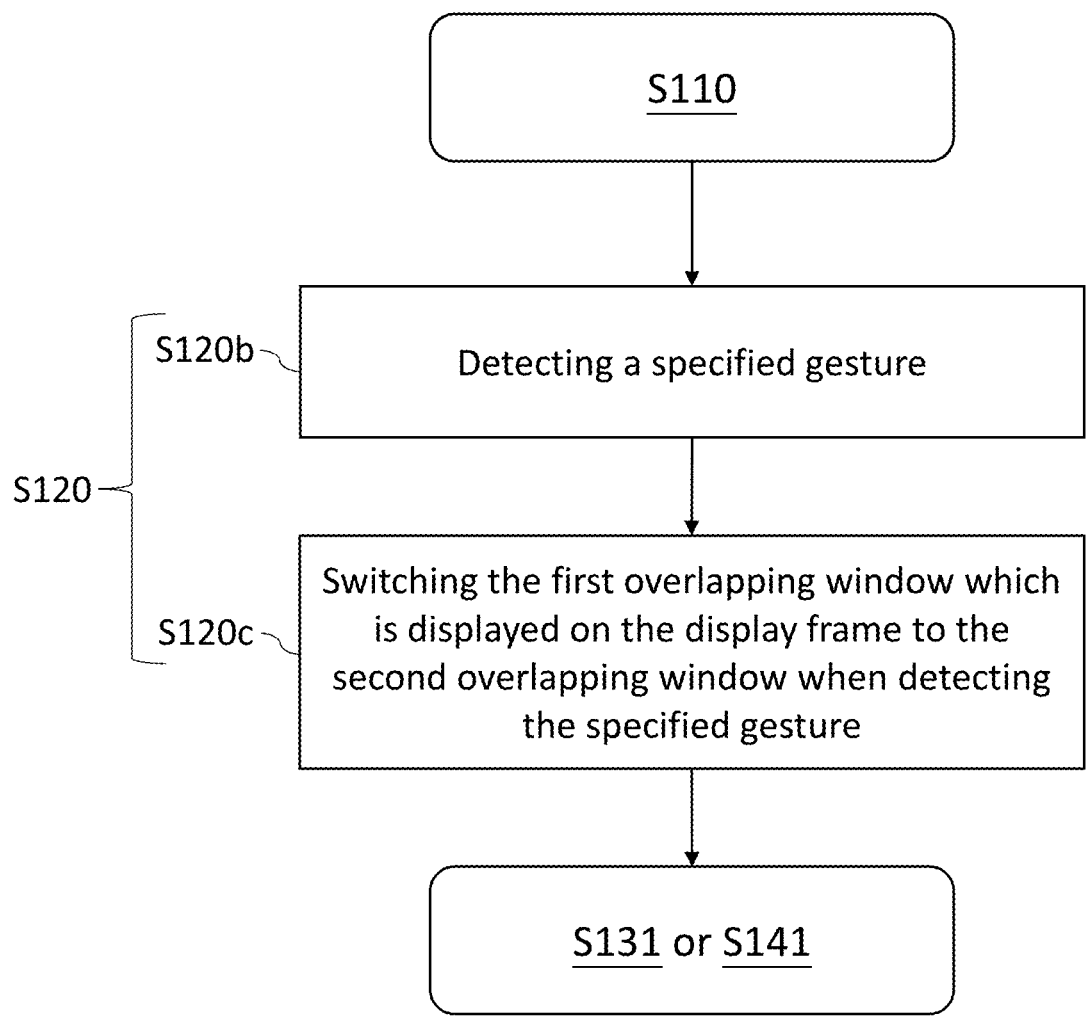
FIG. 27 illustrates a flow chart showing the operation of a second embodiment following the step S110 in FIG. 4.

Please refer to FIG. 1 to FIG. 7, FIG. 13 to FIG. 15, and FIG. 27. In some embodiments, after the step S110, the control module 140 can detect a specified gesture received by the touch display module 130 (the step S120*b*). When the control module detects the specified gesture, the control module 140 controls the touch display module 130 to switch the first overlapping window 220 which is displayed on the display frame 200 to the second overlapping window 240 (the step S120*c*). It should be understood that, the step S120 shown in FIG. 27 is performed after the step S110 in a real-time manner, but the order of the steps is not a limitation for the present disclosure. The step S120 can be performed before or after any step after the step S110 (for example, any one of the steps S131-S134 and S141-S144) under reasonable circumstances.

In some embodiments, the specified gesture is a gesture performed by the user on the touch display module 130 of the mobile device 10, such as but not limited to a single click, a double click, a drag, a flick, a swipe, a zoom-in, a zoom-out, or any combination thereof. In some embodiments, the user can set the specified gesture through the setting window 250.

Figure 24:
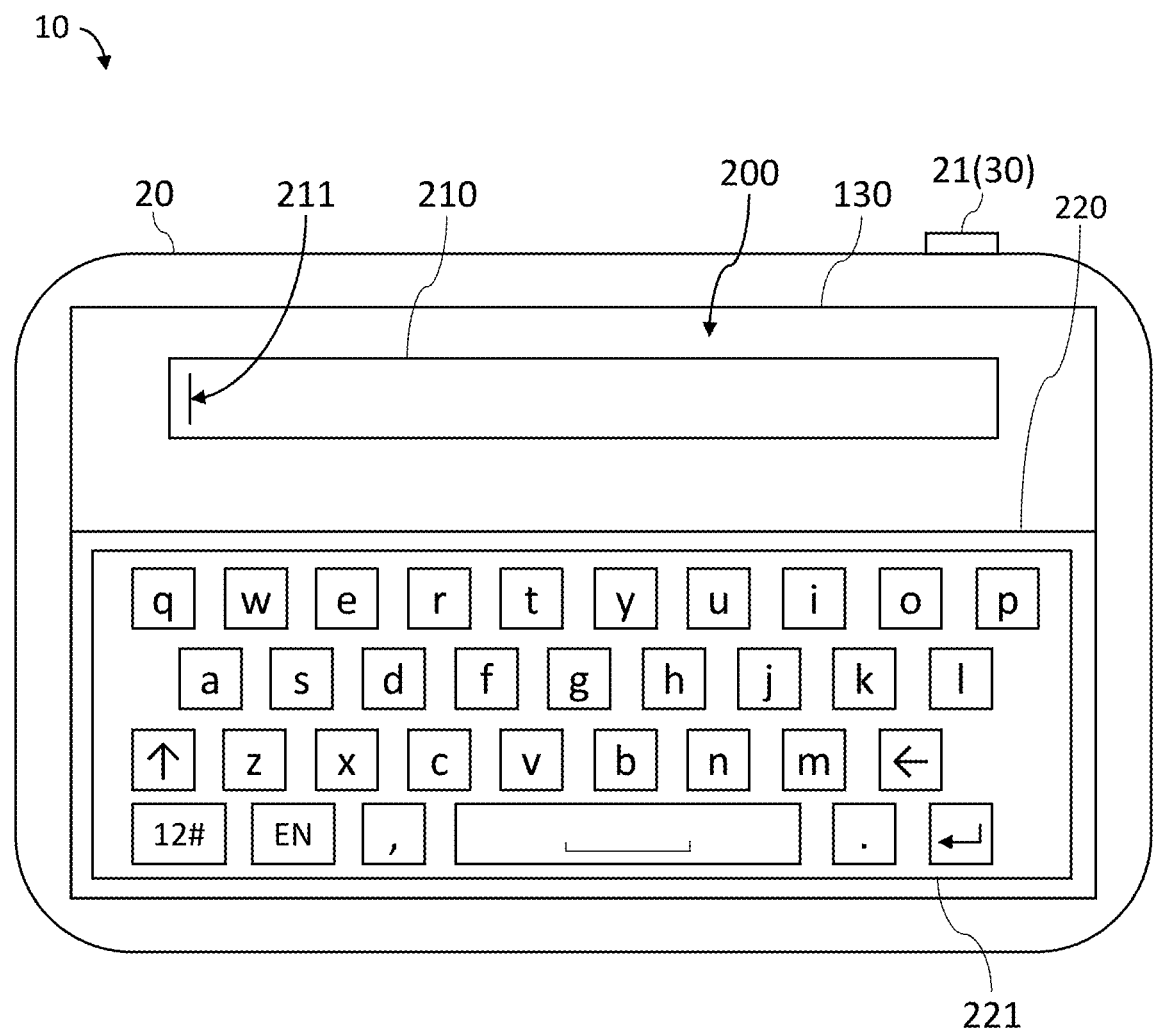
FIG. 24 illustrates a schematic view of an implementation of a trigger element in FIG. 2 after being processed via the step S110a and the step S110b in FIG. 23.

In some implementations, the control module 140 can activate a plurality of trigger elements 30 of different types at the same time, such as at least two of the virtual button 230 shown in FIG. 5, the proximal physical button 21 shown in FIG. 24, and the distal physical button 51 and the specified gesture in FIG. 25 (not shown). In some other implementations, the control module 140 can only activate a single type of the trigger element 30, such as one of the virtual button 230 shown in FIG. 5, the proximal physical button 21 shown in FIG. 24, and the distal physical button 51 and the specified gesture in FIG. 25 (not shown).

In some embodiments, the general camera module 100 and the specific camera module 110 may be photosensitive elements, respectively, wherein the photosensitive element is configured to sense a pattern and convert the pattern into an electronic signal, such as but not limited to a charge-coupled device (CCD) or a complementary metal-oxide-semiconductor (CMOS) sensor.

In some embodiments, the barcode-decoding module 120 and the character recognition engine 150 may be hardware components, respectively, wherein the hardware component has an operating function, such as but not limited to a microprocessor, a graphics processing unit (GPU), an embedded controller, or a microcontroller unit (MCU).

In some embodiments, the barcode-decoding module 120 converts the at least one barcode pattern into the at least one first string according to data in a database built in the mobile device 10, and the character recognition engine 150 converts the at least one string pattern into the at least one second string according to the data in a database built in the mobile device 10.

In some embodiments, the mobile device 10 is coupled to a cloud database in a way of wireless communication through the communication module 160. In some embodiments, the barcode-decoding module 120 converts the at least one barcode pattern into the at least one first string according to data in the cloud database, and the character recognition engine 150 converts the at least one string pattern into the at least one second string according to the data in the cloud database.

In some embodiments, the touch display module 130 may be a display device which has a touch function, such as but not limited to a resistive touch panel, a capacitive touch panel, an infrared touch panel, an optical touch panel, or a surface acoustic wave touch panel.

In some embodiments, the control module 140 may be a hardware component which has a logic processing function, such as but not limited to a central processing unit (CPU), a microprocessor, a digital signal processor (DSP), a complex programmable logic device (CPLD), a field programmable gate array (FPGA), an application specific integrated circuit (ASIC), or an MCU.

In some embodiments, the barcode-decoding module 120, the character recognition engine 150, and the control module 140 may be three hardware components, and each of the three hardware components has a signal processing function.

In some other embodiments, the specific camera module 110 and the barcode decoding module 120 may be integrated into an individual hardware component, that is, a barcode engine (also referred to as a barcode-scanning module). The character recognition engine 150 and the control module 140 may be realized using a single hardware component which has a signal processing function.

In yet some other embodiments, the barcode-decoding module 120, the character recognition engine 150, and the control module 140 may be realized using a single hardware component which has a signal processing function.

In some embodiments, the communication module 160 may be a chip or a circuit which has a wireless communication function, such as but not limited to a Wi-Fi chip, a Bluetooth chip or an infrared chip.

In some embodiments, the control element 50 may be a control device which has a physical button 51 and a wireless communication function, such as but not limited to a stylus, a presentation pen, a remote controller, a wireless mouse, or a wireless keyboard.

In conclusion, according to one or some embodiments, the mobile device or the switching method of the input method thereof have both the system default input method and the image conversion input method so as to provide diverse input functions. Therefore, the user can select an appropriate input method for input operations (such as but not limited to a Chinese/English input, a barcode-scanning input, or an OCR input) when performing a text input of any one of input fields so as to improve the convenience and the efficiency of the text input.

Although the present disclosure has been described in considerable detail with reference to certain preferred embodiments thereof, the disclosure is not for limiting the scope of the invention. Persons having ordinary skill in the art may make various modifications and changes without departing from the scope and spirit of the disclosure. Therefore, the scope of the appended claims should not be limited to the description of the preferred embodiments described above.

What is claimed is:

1. A mobile device comprising:
a general camera module;
a specific camera module;
a barcode-decoding module electrically connected to the specific camera module, wherein the barcode-decoding module is configured to capture at least one barcode pattern through the specific camera module and convert the at least one barcode pattern into at least one first string, and each of the at least one barcode pattern is generated by using the specific camera module to capture at least one barcode;
a touch display module configured to display a display frame, wherein the display frame has an input field; and
a control module electrically connected to the general camera module, the specific camera module, and the touch display module, wherein the control module is configured to activate a trigger element of an image conversion input method in response to an input trigger event of the input field, the control module is configured to control the touch display module to display the input field and a first overlapping window which has a virtual keyboard of a system default input method on the display frame at the same time, the control module is configured to control the touch display module to switch the first overlapping window which is displayed to a second overlapping window in response to a first trigger event of the trigger element, and wherein the second overlapping window has a self-defined keyboard of the image conversion input method and a preview pane of the image conversion input method arranged in parallel;
wherein, the self-defined keyboard and the preview pane are simultaneously displayed on the touch display module in response to that the first overlapping window is switched to the second overlapping window.

2. The mobile device according to claim 1, wherein the trigger element is a virtual button, and the control module is configured to activate the trigger element by controlling the touch display module to display the first overlapping window and the virtual button on the display frame at the same time.

3. The mobile device according to claim 1, further comprising a housing, wherein the general camera module, the specific camera module, and the touch display module are embedded on the housing, the barcode-decoding module and the control module are disposed in the housing, the trigger element is a physical button, the physical button is embedded on the housing and is electrically connected to the control module, the control module is configured to activate the trigger element by enabling an input method switching function of the physical button, and the first trigger event is a switching signal generated by the physical button.

4. The mobile device according to claim 1, further comprising:
a communication module electrically connected to the control module; and
a control element wirelessly connected to the communication module, wherein the trigger element is a physical button on the control element, the control module is configured to activate the trigger element by enabling an input method switching function of the physical button, and the first trigger event is a switching signal generated by the trigger element.

5. The mobile device according to claim 1, wherein the trigger element is a specified gesture, the control module is configured to activate the trigger element by enabling a gesture detection input function of the specified gesture.

6. The mobile device according to claim 1, wherein the control module is further configured to control the touch display module to switch the second overlapping window which is displayed back to the first overlapping window in response to a recurrence of the first trigger event.

7. The mobile device according to claim 1, wherein the control module is further configured to control the touch display module to display a setting window of the image conversion input method in response to a second trigger event of the trigger element.

8. The mobile device according to claim 1, further comprising at least one selection button, wherein the specific camera module is configured to capture a preview frame which has the at least one barcode pattern, the control module is further configured to activate the barcode-decoding module in response to a barcode selection event of the at least one selection button, the control module is further configured to display the preview frame in the preview pane in a real-time manner after the control module activates the barcode-decoding module, and the control module is further configured to display one of the at least one first string in the input field.

9. The mobile device according to claim 8, wherein the at least one barcode pattern comprises a plurality of barcode patterns, the second overlapping window further has a candidate field, the candidate field is above the virtual keyboard and the preview pane, and the control module is further configured to display the at least one first string as input options of the input field in the candidate field after the control module activates the barcode-decoding module.

10. The mobile device according to claim 8, further comprising:
a character recognition engine disposed between the general camera module and the control module, wherein the character recognition engine is configured to capture at least one string pattern and another preview frame which has the at least one string pattern through the general camera module and recognize and convert each of the at least one string pattern into at least one second string, and each of the at least one string pattern is generated by using the general camera module to capture at least one character.

11. The mobile device according to claim 10, wherein the control module is further configured to activate the character recognition engine correspondingly in response to a character selection event of the at least one selection button, the control module is further configured to display the another preview frame in the overlapping window after the control module activates the character recognition engine in a real-time manner, and the control module is further configured to display one of the at least one second string in the input field.

12. The mobile device according to claim 1, wherein the second overlapping window further comprises an enlargement button, and the control module is further configured to control the touch display module to enlarge and display the overlapping window in response to an enlargement trigger event of the enlargement button.

13. A switching method for an input method of a mobile device comprising:
displaying an input field on a display frame;
activating a trigger element of an image conversion input method through the input field and controlling a touch display module to display the input field and a first overlapping window on the display frame at the same time, wherein the first overlapping window has a virtual keyboard of a system default input method; and
switching the first overlapping window on the display frame to a second overlapping window in response to a first trigger event of the trigger element, wherein the second overlapping window has a self-defined keyboard and a preview pane of the image conversion input method arranged in parallel, and the preview pane is linked to a general camera module or a specific camera module;
wherein, the self-defined keyboard and the preview pane are simultaneously displayed on the touch display module in response to that the first overlapping window is switched to the second overlapping window.

14. The switching method according to claim 13, wherein the trigger element is a virtual button, and the at the same timestep of displaying the input field and the first overlapping window on the display frame at the same time comprises:
displaying the input field, the virtual button, and the first overlapping window which has the virtual keyboard of the system default input method on the display frame at the same time.

15. The switching method according to claim 13, wherein the trigger element is a physical button, the first trigger event is a switching signal generated by the physical button, and the step of activating the trigger element of the image conversion input method through the input field comprises:
enabling an input method switching function of the physical button to activate the trigger element.

16. The switching method according to claim 15, further comprising:
receiving the switching signal from the physical button in wired; and
switching the first overlapping window which is displayed on the display frame to the second overlapping window in response to the switching signal.

17. The switching method according to claim 15, further comprising:
receiving the switching signal from the physical button wirelessly; and
switching the first overlapping window on the display frame to the second overlapping window in response to the switching signal.

18. The switching method according to claim 13, wherein the trigger element is a specified gesture, and the switching method further comprises:
detecting the specified gesture; and
switching the first overlapping window which is displayed on the display frame to the second overlapping window when the specified gesture is detected.

19. The switching method according to claim 13, further comprising:
switching the second overlapping window which is displayed on the display frame back to the first overlapping window in response to a recurrence of the first trigger event.

20. The switching method according to claim 13, further comprising:
displaying a setting window of the image conversion input method in response to a second trigger event of the trigger element.

21. The switching method according to claim 13, wherein the image conversion input method comprises a barcode-scanning input method, and the switching method further comprises:
- activating the barcode-scanning input method in response to a barcode selection event;
- scanning at least one barcode through the barcode-scanning input method to obtain at least one first string, wherein the step of scanning the at least one barcode through the barcode-scanning input method comprises:
  - capturing the at least one barcode through the specific camera module to obtain at least one barcode pattern of the at least one barcode; and
  - decoding the at least one barcode pattern into the at least one first string through a barcode-decoding module; and
- displaying one of the at least one first string in the input field.

22. The switching method according to claim 21, wherein in the step of capturing the at least one barcode through the specific camera module, a preview frame which has the at least one barcode pattern is further obtained, and the step of scanning the at least one barcode through the barcode-scanning input method further comprises:
- previewing and displaying the preview frame in the preview pane.

23. The switching method according to claim 21, wherein the at least one first string comprises a plurality of first strings, the second overlapping window further has a candidate field, the candidate field is above the virtual keyboard and the preview pane, and the switching method further comprises:
- displaying the plurality of first strings as input options of the input field in the candidate field.

24. The switching method according to claim 21, wherein the image conversion input method further comprises a character recognition input method, the mobile device further comprises a character recognition engine, and the switching method further comprises:
- activating the character recognition input method in response to a character selection event;
- detecting at least one character through the character recognition input method to obtain at least one second string, wherein the step of detecting the at least one character through the character recognition input method comprises:
  - capturing the at least one character through the general camera module to obtain at least one string pattern of the at least one character and another preview frame which has the at least one string pattern;
  - previewing and displaying the another preview frame in the preview pane; and
  - recognizing and converting the at least one string pattern into the at least one second string through the character recognition engine; and
- displaying one of the at least one second string in the input field.

25. The switching method according to claim 13, wherein the second overlapping window further comprises an enlargement button, and the switching method further comprises:
- enlarging and displaying the preview pane in response to an enlargement trigger event of the enlargement button.

* * * * *